(12) United States Patent
Martinazzi et al.

(10) Patent No.: US 11,138,255 B2
(45) Date of Patent: Oct. 5, 2021

(54) PROVIDING COMBINATIONS OF PRE-GENERATED AND DYNAMIC MEDIA EFFECTS TO CREATE CUSTOMIZED MEDIA COMMUNICATIONS

(71) Applicant: Facebook, Inc., Menlo Park, CA (US)

(72) Inventors: Peter Henry Martinazzi, Huntington Beach, CA (US); Christian Xavier Dalonzo, Sewell, NJ (US); Jennifer A. Burge, Oakland, CA (US); Xiaobin Wu, Menlo Park, CA (US); Chih Shao Lee, Sunnyvale, CA (US); Puneet Sethi, Santa Clara, CA (US); Jennifer Terra Hansen, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 182 days.

(21) Appl. No.: 15/717,551

(22) Filed: Sep. 27, 2017

(65) Prior Publication Data
US 2019/0095436 A1 Mar. 28, 2019

(51) Int. Cl.
*G06F 16/438* (2019.01)
*G06F 16/951* (2019.01)
*G06T 11/60* (2006.01)
*H04L 12/58* (2006.01)
*G06K 9/00* (2006.01)
(Continued)

(52) U.S. Cl.
CPC .......... *G06F 16/438* (2019.01); *G06F 16/951* (2019.01); *G06T 11/60* (2013.01); *H04L 51/10* (2013.01); *G06F 3/04842* (2013.01); *G06K 9/00228* (2013.01); *G06K 9/00288* (2013.01);
(Continued)

(58) Field of Classification Search
CPC ............. G06F 17/2785; G06F 16/3329; G06F 16/3347; G06F 16/338; G06F 17/2715; G06F 17/277; G06F 17/30654; G06F 17/3069; G06F 17/30696; G06F 16/438; G06F 16/951; G06F 3/04842; G06Q 50/01; G06T 11/60; H04L 51/10; H04L 67/306;
(Continued)

(56) References Cited

U.S. PATENT DOCUMENTS 10,409,488 B2 * 9/2019 Paek .................... G06F 3/04883
10,474,877 B2 * 11/2019 Huang .................. G06F 16/435
(Continued)

OTHER PUBLICATIONS

Kim et al., A Picture is Worth a Thousand Words: Improving Mobile Messaging with Real-time Autonomous Image Suggestion, HotMobile '16 Proceedings of the 17th International Workshop on Mobile Computing Systems and Applications, pp. 51-56. (Year: 2016).*

*Primary Examiner* — Cheyne D Ly
(74) *Attorney, Agent, or Firm* — Keller Jolley Preece

(57) ABSTRACT

The present disclosure is directed toward systems, computer-readable media, and methods for providing customized media effects for use in media communications. For example, systems and methods described herein utilize search terms along with contextual information associated with a client-computing device and characteristic information associated with a digital media item to identify pre-generated media effects and to generate dynamic media effects. Systems and methods described herein score and rank the identified and generated media effects to as to provide listings of media effects that are most likely to appeal to a user of the client-computing device.

20 Claims, 15 Drawing Sheets

(51) Int. Cl.
G06F 3/0484 (2013.01)
H04L 29/06 (2006.01)
H04L 29/08 (2006.01)

(52) U.S. Cl.
CPC ............ *H04L 67/22* (2013.01); *H04L 67/306* (2013.01); *H04L 67/42* (2013.01)

(58) Field of Classification Search
CPC ..... H04L 67/22; H04L 67/42; G06K 9/00288; G06K 9/00228
See application file for complete search history.

(56) References Cited

U.S. PATENT DOCUMENTS

| | | | |
|---|---|---|---|
| 10,565,245 B2* | 2/2020 | Imbruce | G06F 40/106 |
| 2014/0173396 A1* | 6/2014 | Imbruce | G06F 16/285 |
| | | | 715/202 |
| 2016/0034977 A1* | 2/2016 | Bhaowal | G06F 16/951 |
| | | | 707/722 |
| 2016/0035074 A1* | 2/2016 | Jeong | G06T 3/40 |
| | | | 382/282 |
| 2016/0098851 A1* | 4/2016 | Wu | G06T 11/60 |
| | | | 345/634 |
| 2017/0092321 A1* | 3/2017 | Anderson | G06F 3/016 |
| 2018/0054405 A1* | 2/2018 | Ritch | G06F 17/276 |
| 2018/0191797 A1* | 7/2018 | Javier | G06F 40/174 |

\* cited by examiner

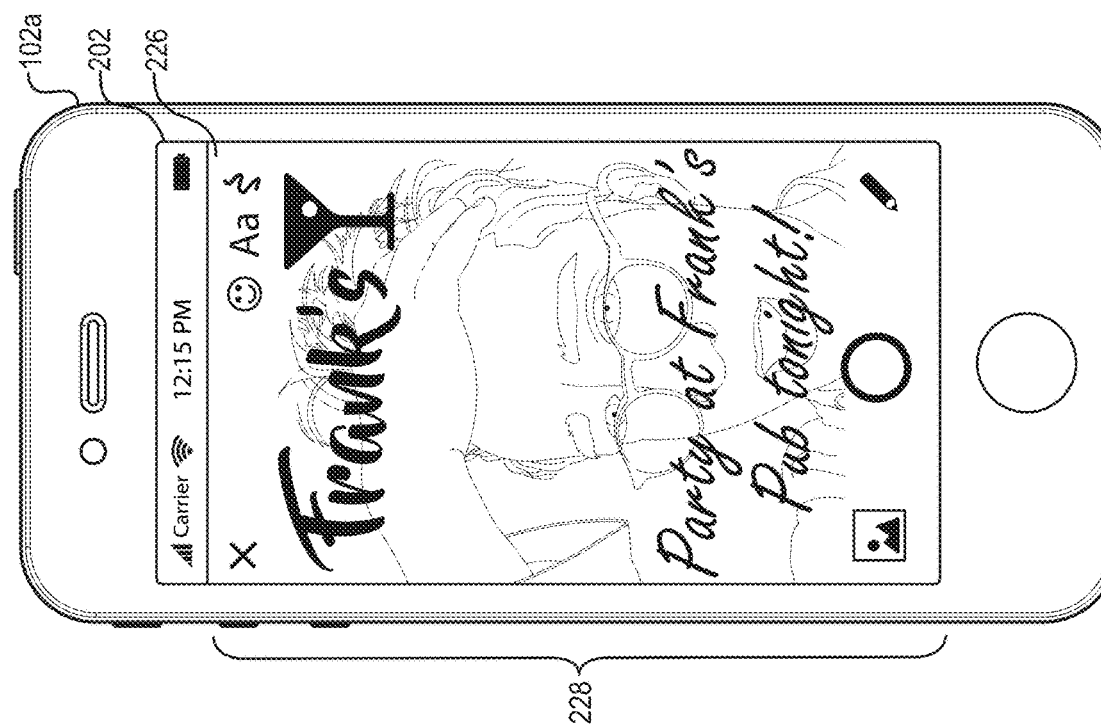

PROVIDING COMBINATIONS OF PRE-GENERATED AND DYNAMIC MEDIA EFFECTS TO CREATE CUSTOMIZED MEDIA COMMUNICATIONS

BACKGROUND

Media communication (or communications including digital images or videos) is an increasingly popular method for users to engage with each other. For example, where a user might have in the past composed a text communication to share news, the user may now post a digital video/image sharing the news. Media communications have become a preferred means of communication because digital videos, photographs, and the like generally take less time to create than a written message. Similarly, media communications are capable of effectively communicating more than a typical written message.

As media communications have gained popularity, so too have media effects. Media effects are special digital effects applied to a media communication in order to make the communication more interesting, fun, and/or engaging. For example, if a user is creating a digital video to discuss a recent victory of a favorite sports team, existing systems enable the user to apply a frame including the sports team's name and colors around the video display. Other media effects can change displayed colors, add text, alter the appearance of people or articles, add additional graphics or animations, and so forth.

Creating media communications with media effects is now so commonplace that there are an ever-increasing number of media effects available to users. This increasing number of media effects, however, is problematic in many ways. For example, the number of media effects that a user generally has to select from is often overwhelming.

In order to address the unwieldly nature of large collections of media effects, some conventional systems provide the user with a subset of the collection of media effects. For example, such conventional systems limit the number of media effects available to all users to a predetermined subset that the system periodically rotates. Thus, such conventional systems may provide a first subset of media effects for a week or month and then change the available media effects to a second subset for the next week or month. While providing a universal set of filtered/default media effects to all users/devices helps reduce the problem of searching through a large collection of media effects, it also limits a user's ability to access large numbers of the media effects that may be suitable or desirable for a given communication.

Other conventional systems provide a list of default media effects to all users. If users desire access to additional media effects the users must purchase, download, or unlock the additional media effects. While limiting media effects to a list of default media effects helps reduce the problem of searching through a large collection of media effects, it has other negative drawbacks. In particular, many users often never purchase, download, or unlock the additional media effects due to not knowing this is an option or not having the technical ability, time, or money to access the additional media effects. Thus, the use of a list of default media effects effectively prevents many users from ever accessing or using media effects that may be relevant or desirable for a given communication. Other users may desire and know how to purchase, download, or unlock additional media effects but may again be faced with the difficulty of having to search through large numbers of additional features to find or discover the media effects they wish to make available.

Thus, adding media effects to various types of media communications is typically a time consuming and often frustrating experience. For example, adding a special graphic overlay to a digital photograph generally requires that a user search through lists of tens or even hundreds of graphics. If the user wishes to add additional media effects to the digital photograph, the user must perform additional searches. Accordingly, in order to create a rich and eye-catching media communication, the user must spend several minutes searching for various media effects and applying the media effects to the digital photograph.

As such, users often miss the opportunity to create engaging media communications "in the moment." Rather, users edit their photographs and videos at a later time, or they skip enhancing their media communications altogether. Accordingly, a need exists for a fast and easy way to add media effects to digital photographs and videos that make for interesting and engaging media communications that are relevant.

SUMMARY

One or more embodiments described herein provide benefits and/or solve one or more of the foregoing or other problems in the art with systems, computer-readable media, and methods for dynamically providing combinations of media effects to generate media posts that are customized based on an underlying digital media item and other contextual information. For example, in one or more embodiments, the systems, computer-readable media, and methods described herein receive a digital media item (e.g., a digital photograph or digital video) and a search term associated with the digital media item. The systems, computer-readable media, and methods described herein then utilize the search term, as well as the other contextual information, to identify pre-generated media effects, and to generate dynamic media effects. The systems, computer-readable media, and methods then provide the identified and generated media effects such that a user may rapidly apply one or more media effects to the digital media item. Thus, the systems and methods described herein generate enhanced media posts that a user can share, post, or send to others quickly and easily.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIGS. 2A-2C illustrate a series of graphical user interfaces that the media effect system can provide in identifying and generating media effects prior to the user accessing the camera viewfinder display in accordance with one or more embodiments;

DETAILED DESCRIPTION

Figure 1:
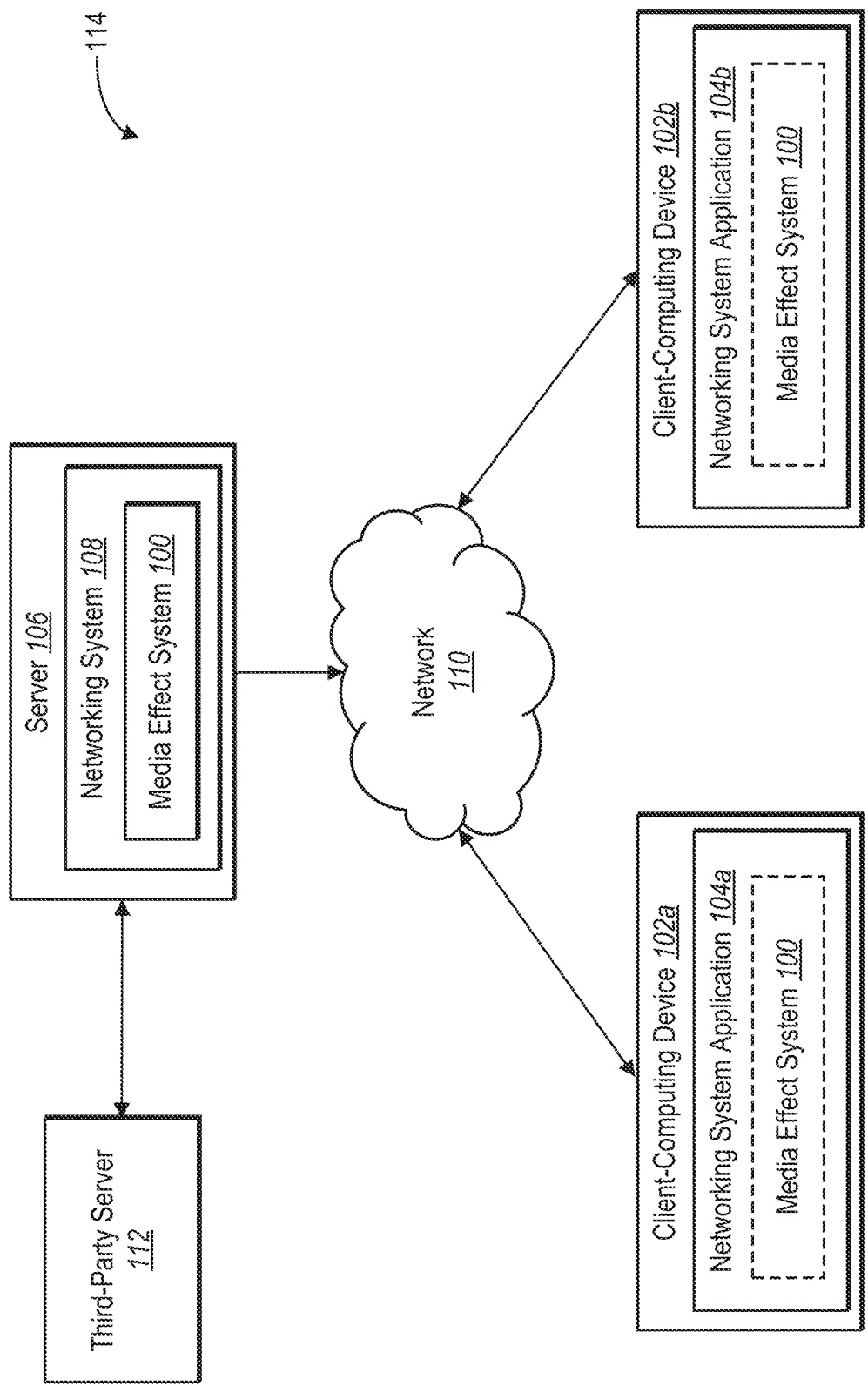
FIG. 1 illustrates an environmental diagram of a media effect system in accordance with one or more embodiments.

In one or more embodiments, a media effect system generates a media communication tailored to a determined search term. In particular, the media effect system identifies the search term based on one or more of user-provided information, characteristics of a digital media item (e.g., a captured digital photograph or video), or contextual information associated with a client-computing device and/or the user of the client-computing device. Based on the search term, the media effect system generates a customized media communication including the digital media item and media effects. In this manner, the media effect system provides an enhanced media communication that requires little or no additional input from the user of the client-computing device but is relevant to the current situation of the user.

As used herein, a "media communication" refers to a rich communication object that includes an underlying digital media item (e.g., a digital photograph or video) and one or more media effects. For example, as used herein, a "media effect" refers to a modification technique applied to a digital media item. Media effects can include one or more media assets (i.e., types or categories of modification techniques) applied to the digital media item. Examples of media assets include, but are not limited to, frames, filters, masks, overlays, animations, graphics, distortions, morphs, modifications, designs, stickers, and text items. Thus, a media effect can include one or more media assets.

The media effect system can access pre-generated (e.g., pre-generated by a content creator) media effects that include one or more media assets. In one or more embodiments, pre-generated media effects are un-alterable (e.g., flattened). For example, a pre-generated media effect may be designed by an artist or celebrity as part of a promotion via a networking system. Thus, the pre-generated media effect is essentially locked from further user editing. Additionally, the media effect system can generate dynamic media effects that include one or more media assets (e.g., pre-generated media effects). In one or more embodiments, media assets included in a dynamic media effect are alterable. For example, the media effect system enables the user to change positions, colors, and opacity of media assets within a dynamic media effect. Additionally, the media effect system enables the user to remove or add media assets to or from a dynamic media effect.

To illustrate the various example features and functionalities of the media effect system, an example embodiment includes the media effect system receiving a digital media item (e.g., a digital photograph) captured by a client-computing device (e.g., a mobile phone). Additionally, in at least one embodiment, the media effect system also receives a user-provided search term in association with the digital photograph. For example, the user-provided search term may include a single word that is associated with the contents, location, or subject matter of the digital photograph.

Optionally, the media effect system automatically determines search terms in addition to any user-provided search terms. For example, in response to receiving the digital photograph and user-provided search term, the media effect system collects and analyzes additional information in order to determine one or more additional search terms. For instance, in one or more embodiments, the media effect system receives and analyzes contextual information that indicates the context in which the digital photograph was taken.

In one or more embodiments, contextual information includes, but is not limited to, the location information associated with the client-computing device (e.g., GPS information, weather information, public event information), client-computing device sensor information (e.g., camera viewfinder information, gyroscope information), client-computing device application information (e.g., which applications are open and the operations those applications are performing, activity history associated with the applications installed on the client-computing device), and social networking system information associated with the user of the client-computing device (e.g., the user's demographic information, social networking system activity history, information related to the user's social networking system "friends"). From this information, the media effect system can determine the context of the client-computing device. For example, the media effect system can determine the time of day during which the digital photograph was taken, the weather conditions existing when the digital photograph was taken, an event at which the digital photograph was taken, which camera (e.g., front-facing or rear-facing) associated with the client-computing device that the digital photograph was taken with, the orientation of the client-computing device (e.g., portrait or landscape) when the digital photograph was taken, social networking system users nearby when the digital photograph was taken, and other activities the user of the client-computing device was engaged in (e.g., listening to music, talking on a phone call) while the digital photograph was taken. In response to determining the context during which the digital photograph was taken, the media effect system can determine additional search terms associated with the received digital photograph.

Furthermore, the media effect system can analyze characteristics of the digital photograph (e.g., if the photograph has already been captured) utilizing computer vision techniques in order to determine further search terms. For example, the media effect system can perform facial analysis on one or more people depicted in the digital photograph to identify social networking system users. Additionally, the media effect system can perform object analysis to identify locations, animals, landmarks, and other items within the digital photograph. Based on these operations, the media effect system can determine further search terms that are associated with the actual contents of the digital photograph. For example, if the visual analysis of the digital photograph results in the identification of a landmark, the media effect system can identify the location of the landmark. The media effect system can then use the name of the landmark as at least one of the one or more search terms associated with the digital photograph.

After determining one or more search terms associated with the received digital media item (e.g., the digital photograph), the media effect system utilizes the one or more determined search terms, in addition to the user-provided search term, to identify pre-generated media assets. As mentioned above, in one or more embodiments, the media effect system stores or accesses pre-generated media effects created by third parties such as professional designers, celebrities, or other public figures. In at least one embodiment, pre-generated media effects are associated with descriptive metadata. In such an embodiment, the media effect system creates an indexed database of pre-generated media effects where each pre-generated media effect is cross-referenced based on its descriptive metadata. Accordingly, in one or more embodiments, the media effect system identifies pre-generated media effects that respond to the one or more search terms by searching the indexed database of pre-generated media effects based on the one or more search terms.

In one or more embodiments, the media effect system scores and ranks the identified pre-generated media effects based on contextual information associated with the digital photograph. For example, the media effect system can analyze descriptive metadata associated with each identified pre-generated media effect to determine correlations between the metadata and the contextual and characteristic information, described above. The media effect system can then calculate a score for each identified pre-generated media effect based on the strength of those correlations.

To illustrate, the contextual information may include client-computing device application information indicating a history of pre-generated media effects the user of the client-computing device has previously selected. The media effect system can analyze this history to determine the user often selects pre-generated media effects created by a particular artist. Thus, the media effect system may calculate a higher score for identified pre-generated media effects with descriptive metadata indicating they were created by the same artist.

Furthermore, in one or more embodiments and after determining the one or more search terms associated with the received digital photograph, the media effect system also generates dynamic media effects. As mentioned above, a dynamic media effect is a customized media effect that include one or more media assets that respond to the one or more search terms. For example, in one or more embodiments, the media effect system creates and maintains an indexed database of media assets where each media asset is cross-referenced based on its descriptive metadata. Accordingly, the media effect system can identify one or more media assets that respond to the one or more search terms by searching the indexed database for media assets that are cross-referenced to each of the one or more search terms.

In at least one embodiment, the media effect system further scores the identified media assets based on the contextual information associated with the client-computing device and characteristic information associated with the digital photograph in order to determine which identified media effects are best suited for use in a customized media effect. For example, the media effect system can analyze the descriptive metadata associated with each identified media asset to find correlations between the media asset and the contextual information described above and score the identified media asset based on the strength of those correlations. To illustrate, the contextual information and characteristic information may indicate the digital photograph depicts a famous work of art, and was taken while the user of the client-computing device was visiting a local art gallery and listening to Beethoven's Ninth Symphony. Based on these determinations, the media effect system will calculate a higher score for identified media assets with descriptive metadata indicating the media assets are associated with music, art, the local art gallery, Beethoven, and/or the depicted famous work of art.

After generating scores for each of the identified media assets, the media effect system generates a dynamic media effect by inserting one or more of the scored media assets into a media effect template. For example, in one or more embodiments, the media effect system maintains a collection of blank templates, where each template includes one or more fields with which a media asset can be associated. In at least one embodiment, the media effect system selects an appropriate template based on a visual analysis of the digital photograph. For example, the media effect system can identify blank or unimportant areas within the digital photograph in order to identify a template with fields corresponding to those identified areas.

In one or more embodiments, the media effect system then generates the dynamic media effect by associating media asset with the fields in the identified template, starting with the top-scoring media asset. In at least one embodiment, if the template includes more than one field, the media effect system utilizes various rules, grammars, and algorithms in associating additional media assets with the additional fields in the template. For example, in one embodiment, the media effect system may simply associate media assets with the template fields based on descending score. In another embodiment, in order to avoid competing media assets (e.g., media assets of the same type), clashing colors, or the like, the media effect system may apply rules to the selection process such as "no more than one mask per template," or "select additional media assets based on the color scheme of the first selected media asset." Alternatively, the selected template may include rules associated with each field that dictate the type of media asset that may be associated with that field. In that embodiment, the media effect system can simply select the top-scoring media asset that obeys the rule for each template field.

In at least one embodiment, the media effect system repeats this process in order to generate additional dynamic media effects. For example, the media effect system can repeat the steps outlined above for additionally selected templates until all of the scored media assets have been associated with a template. Alternatively, the media effect system may simply generate a pre-defined number of dynamic media effects. Furthermore, in at least one embodiment, the media effect system ranks the generated dynamic media effects. For example, in one or more embodiments, the media effect system ranks the dynamic media effects in the order in which they were generated such that the top-ranked dynamic media effect includes the highest scored media assets, and so forth in descending order.

In one or more embodiments, the media effect system determines that the received and/or determined one or more search terms fail to result in the identification of any pre-generated media effects or media assets. Thus, in at least one embodiment, the media effect system generates a fallback media effect that is based on the user-provided search term, and/or the analyzed contextual information and characteristic information associated with the digital photograph. For example, the media effect system can generate the fallback media effect including a stylized version of the user-provided search term that matches the color scheme of the received digital photograph. In another example, the media effect system can generate a fallback media effect including a cloudy sky overlay in response to determining that even though the digital photograph was taken indoors, the weather outside on day the digital photograph was taken was overcast.

In at least one embodiment, the media effect system generates a score for each generated fallback media effect based on the contextual information and/or the characteristic information associated with the digital photograph, described above. For example, the media effect system can calculate a score based on a history of the user's previous media effect selections, or on a visual analysis of the digital photograph. The media effect system can then rank the fallback media effects in descending order based on the calculated scores.

In additional embodiments, the media effect system identifies and generates media effects in connection with other types of digital media items (e.g., digital videos). Also in additional embodiments, as will be described below, the media effect system identifies and generates media effects prior to the capture of a digital media item.

In one or more embodiments, after identifying pre-generated media effects, and generating dynamic media effects and fallback media effects, the media effect system provides the pre-generated media effects, dynamic media effects, and fallback media effects to the client-computing device. In at least one embodiment, the media effect system provides the media effects to the client-computing device based on each effect's determined rank. For example, the media effect system can provide the media effects in descending rank, such that the media effects displayed first are those most likely to appeal to the user of the client-computing device. In response to the detected selection of any of the provided media effects at the client-computing device, the media effect system generates a customized media communication including the digital photograph and the selected media effect. In at least one embodiment, in response to generating the customized media communication, the media effect system automatically sends the customized media communication to one or more recipients.

Accordingly, the media effect system provides a number of advantages over conventional systems. For example, the media effect system provides robust search capabilities in combination with rich media effect generation that requires little display space. For example, the media effect system enable a user to provide a search term and select one or more customized media effects without having to open additional displays, windows, or applications. Additionally, the media effect system determines search terms and generates media effects without requiring the user to switch back and forth between additional displays, windows, or lists in order to create a customized media communication.

The media effect system saves the user time and energy by providing a customized media effect tailored specifically to the user and the user's client-computing device. Thus, one or more embodiments intelligently and dynamically filter media effects to create an on point customized media effect, thereby reducing the need to search through large numbers media effects. Furthermore, the media effect system provides such benefits while allowing media effects from the entire library of media effects to be included in the surfaced or chosen media effects. Thus, rather than providing a universal set of filtered/default media effects to all users/devices, the media effect system intelligently and dynamically customizes a limited set of featured media effects while providing the flexibility of including any media effect in the set of featured media effects.

FIG. 1 illustrates an example environment 114 for implementing the media effect system 100. As illustrated in FIG. 1, the environment 114 includes client-computing devices 102a, 102b that implement networking system applications 104a, 104b. In one or more embodiments of the present disclosure, the networking system applications 104a, 104b comprise a social-networking system (such as but not limited to FACEBOOK™), but in other embodiments the networking system applications 104a, 104b may comprise another type of application, including but not limited to an e-mail application, search engine application, banking application, or any number of other application types that utilizes user accounts. Further shown in FIG. 1, the environment 114 also includes a server 106 hosting a networking system 108 that includes the media effect system 100. The networking system 108 can comprise a system that connects and allows exchange of data over a network. For example, the networking system can comprise a social networking system, a banking system, a search engine, a messaging system, an email system, etc. Also, illustrated in FIG. 1, in one or more embodiments, the networking system 108 operates the media effect system 100. In additional or alternative embodiments, the networking system application 104a, 104b includes part or all of the media effect system 100 installed on the client-computing devices 102a, 102b respectively.

The client-computing devices 102a, 102b and the server 106 communicate via a network 110, which may include one or more networks and may use one or more communication platforms or technologies suitable for transmitting data and/or communication signals. In one or more embodiments, the network 110 includes the Internet or World Wide Web. The network 110, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular number and arrangement of client-computing devices, in additional embodiments the client-computing devices 202a, 202b may directly communicate with the networking system 108, bypassing the network 110. Further, in other embodiments, the environment 114 may include any number of client-computing devices. Additional details with respect to the client-computing devices 102a, 102b are discussed below with respect to FIG. 7.

In one or more embodiments, the client-computing devices 102a, 102b can be one of various types of computing devices. For example, each of the client-computing devices 102a, 102b may include a mobile device such as a mobile telephone, a smartphone, a PDA, a tablet, or a laptop. Additionally, or alternatively, the client-computing devices 102a, 102b may include a non-mobile device such as a desktop computer, a server, or another type of computing device. It will be understood that a both client-computing devices 102a, 102b can include the same type of computing functionality. In other words, in a preferred embodiment, both the client-computing device 102a and the client-computing device 102b are mobile computing devices, such as smartphones. In at least one embodiment, the user of the client-computing device 102a and the user of the client-computing device 102b are associated (e.g., "friends") via the networking system 108.

In one or more embodiments, each of the client-computing devices 102a, 102b include a networking system application 104a, 104b associated with the networking system 108. For example, the networking system application 104a, 104b enables the users of the client-computing devices 102a, 102b to view and interact with networking system content, and to submit media communications, posts, and other content to other users via the networking system 108. In at least one embodiment, media communications and other content submitted to the networking system 108 from the client-computing device 102a can be viewed and interacted with at the client-computing device 102b, and vice versa. Furthermore, in at least one embodiment, as mentioned above, the networking system application 104a, 104b includes part or all of the media effect system 100.

As shown in FIG. 1, and as mentioned above, the server 106 hosts the networking system 108. In one or more embodiments, the networking system 108 provides posts, electronic message, structured objects, and live video streams to one or more co-users (e.g., by way of a profile, a newsfeed, a communication thread, a timeline, a "wall," a live video stream display, or any other type of graphical user interface presented via the communications client application on the client-computing devices 102a, 102b). For example, one or more embodiments provide a user with a communication thread including one or more electronic messages exchanged between the users of the client-computing device 102a, and the client-computing device 102b. In another example, one or more embodiments provide a user with a social networking system newsfeed containing posts from one or more co-users associated with the user (e.g., the user's "friends"). In one or more embodiments, a post and/or electronic message can include one or more media communications (e.g., edited or unedited digital photographs and digital videos), such as described above.

The networking system 108 also enables the user to engage in all other types of communications system activity. For example, the networking system 108 enables a social networking system user to interact with communication threads, click on posts and hyperlinks, compose and submit electronic messages and posts, interact with structured object, watch live video streams, interact with media communications, and so forth.

In one or more embodiments, the media effect system 100, described with reference to FIG. 1, may be implemented by the networking system 108, the server 106, or any of the client-computing devices 102a, 102b. For example, in one embodiment, the networking system 108 includes the media effect system 100. In that embodiment, the networking system applications 104a, 104b enable the client-computing devices 102a, 102b to interface with the media effect system 100 remotely across the network 110. In another embodiment, the networking system applications 104a, 104b both include the media effect system 100. In that embodiment, the networking system applications 104a, 104b may communicate with the networking system 108 and/or the server 106 (or other servers) in order to receive context information, media effect information, and so forth.

The environment 114 illustrated in FIG. 1 further includes a third-party server 112. The media effect system 100 can obtain pre-generated media effects and media assets, as well as other contextual information from the third-party server 112. For example, upon detecting a location of the client-computing device 102a, the media effect system 100 can query a weather server for the current weather at the detected location. The media effect system 100 can then query pre-generated media effects from a particular designer that are associated with the current weather.

As will be described in more detail below, the components of the media effect system 100 can provide, along and/or in combination with the other components, one or more graphical user interfaces ("GUIs"). In particular, the networking system applications 104a, 104b on the client-computing devices 102a, 102b can display one or more GUIs generated by the media effect system 100, described above. The networking system applications 104a, 104b enable the user of the client-computing device 102a and/or the user of the client-computing device 102b to interact with a collection of display elements within one or more GUIs for a variety of purposes. FIGS. 2A-4G and the description that follows illustrate various example embodiments of the GUIs that are used to describe the various features of the media effect system 100.

Figure 2B:
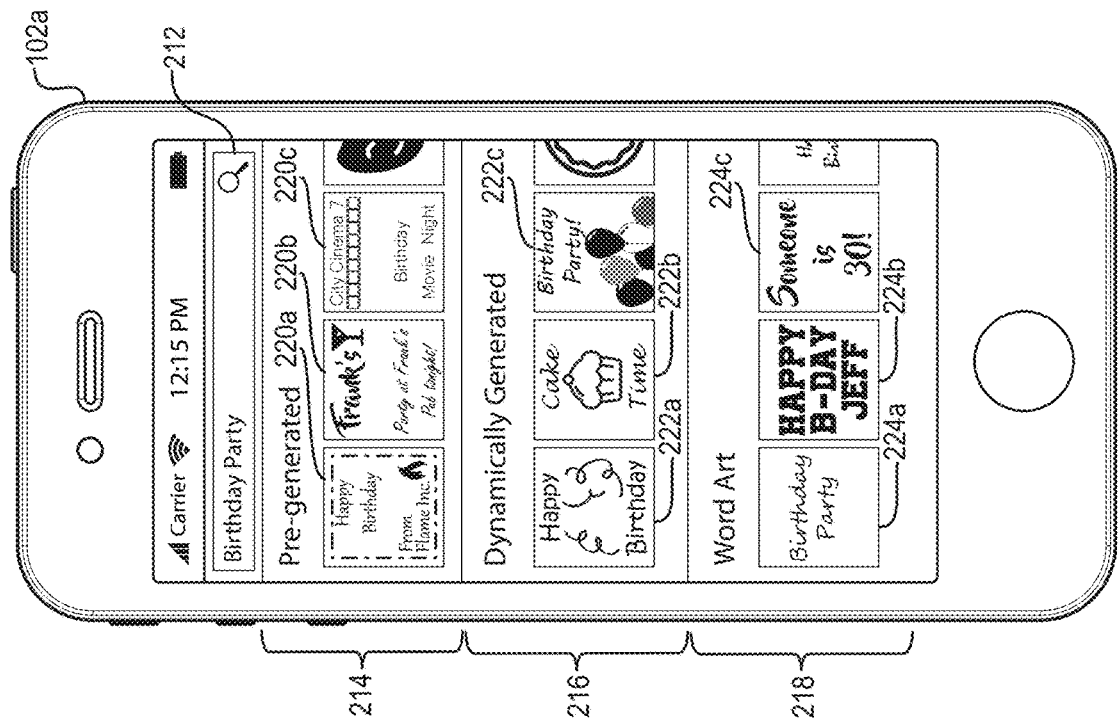
Figure 2A:
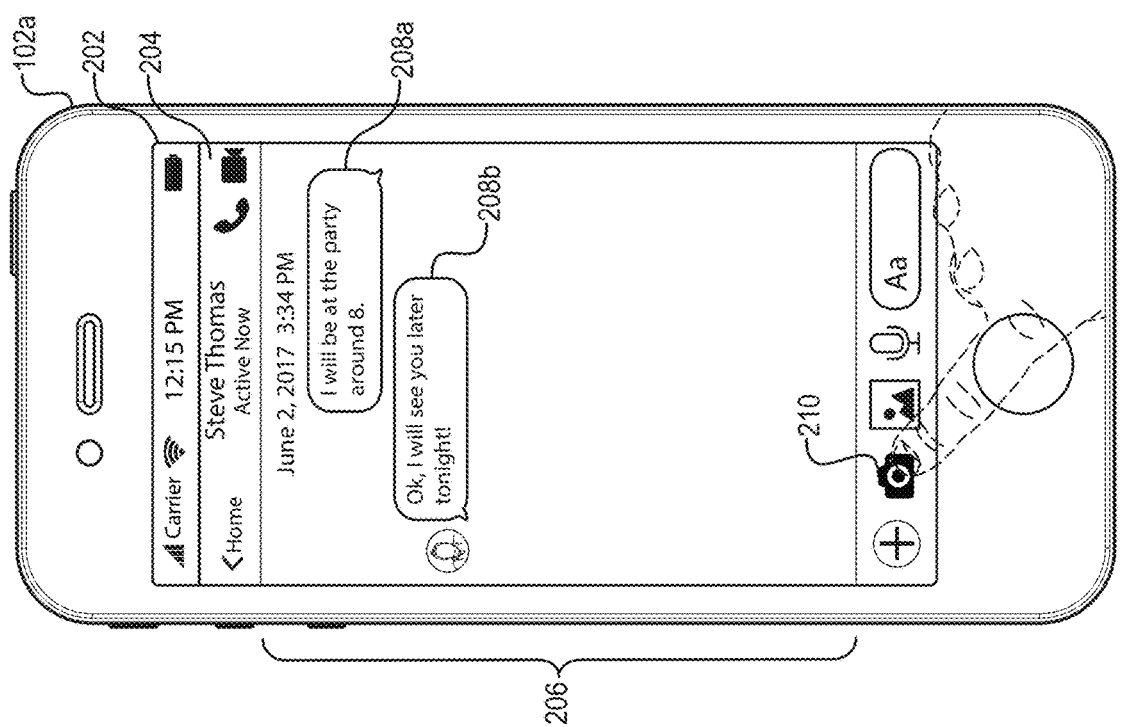

For example, as mentioned above, the media effect system 100 provides various features and functionality to the user in response to the user initializing an application in order to create a media communication. FIG. 2A illustrates the media effect system 100 providing a communication thread GUI 204 on a touch screen display 202 on the client-computing device 102a. In one or more embodiments, the networking system application 104a (as described with reference to FIG. 1) organizes one or more electronic communications 208a, 208b within a communication thread 206 displayed within the communication thread GUI 204. For example, the networking system application 104a organizes the electronic communications 208a, 208b chronologically in the communication thread 206 in the order they were received and displays each electronic communication 208a, 208b so as to indicate the sender of each communication. In at least one embodiment, the communication thread 206 includes the electronic communications 208a, 208b exchanged between the user of the client-computing device 102a (e.g., the electronic communication 208a) and the user of the client-computing device 102b (e.g., the electronic communication 208b).

As further shown in FIG. 2A, the communication thread GUI 204 provides various options for the creation of electronic communications. For example, in response to a detected selection of the camera button 210, the media effect system 100 enables the user to create a media communication that includes one or more digital media items. In one or more embodiments, the media effect system 100 enables the user to search for media effects prior to capturing a digital media item. For example, as shown in FIG. 2B, in response to a detected selection of the camera button 210, rather than immediately providing a camera viewfinder display, the media effect system 100 presents the search term input box 212, wherein the user of the client-computing device 102a can enter one or more search terms. Then, in response to receiving a search term via the search term input box 212

(e.g., "Birthday Party"), the media effect system 100 identifies, generates, and presents one or more media effects, as will be described in greater detail below. In one or more embodiments, the user of the client-computing device 102a can input a search term into the search term input box 212 by utilizing a touch screen display keyboard. In at least one additional or alternative embodiment, the media effect system 100 can receive one or more user-provided search terms in response to the user of the client-computing device 102a simply speaking the one or more search terms such that voice activation features of the client-computing device 102a can process the user's voice.

In one or more embodiments, the media effect system 100 determines one or more search terms in addition to the search terms received via the search term input box 212 based on contextual information associated with the client-computing device 102a. For example, as discussed above, contextual information associated with the client-computing device 102a includes location information (e.g., GPS information, Wi-Fi information), sensor information (e.g., from one or more cameras, gyroscopes, accelerometers), application information (e.g., activity history information, current activity information), and networking system information associated with the user of the client-computing device 102a. In one or more embodiments, the media effect system 100 analyzes this contextual information to determine where the client-computing device 102a is located, the conditions (e.g., the weather, the setting, the lighting) where the client-computing device 102a is locations, an event the user of the client-computing device 102a is currently attending, nearby events of note, nearby networking system users, and what other activities the user of the client-computing device 102a is currently utilizing the client-computing device 102a to perform (e.g., listening to music, viewing social media). In other words, the media effect system 100 determines the context under which the client-computing device 102a is currently being used.

Based on this contextual analysis, the media effect system 100 can determine additional search terms. For example, if the contextual analysis indicates the client-computing device 102a is located at a city park and is playing a popular hip-hop song, the media effect system 100 can determine additional search terms including the name of the city park, the current weather, outdoor themes, the time of day, the name of the hip-hop song, and the hip-hop artist associated with the song. Furthermore, in the event that the media effect system 100 does not receive any user-provided search terms via the search term input box 212, the media effect system 100 can still identify and generate media effects based on search terms generated from the contextual analysis described above.

Furthermore, in at least one embodiment, the media effect system 100 can provide one or more media effects prior to or without receiving a user-provided search term based on activity history. For example, in at least one embodiment, the media effect system 100 analyzes activity history associated with the networking system application 104a to identify and present one or more recently used media effects. Additionally, the media effect system 100 can analyze contextual information associated with the client-computing device 102a (e.g., GPS location data) to identify and present one or more media effects that correlate with the location of the client-computing device 102a.

In one or more embodiments, in response to receiving at least one user-provided search term (e.g., "Birthday Party") via the search term input box 212 and determining additional contextually-based search terms, the media effect system 100 identifies and presents one or more pre-generated media effects in the pre-generated media effect scroll 214. For example, as mentioned above, the media effect system 100 stores and/or accesses pre-generated media effects that are created or designed by third-parties (e.g., sponsors, advertisers, celebrities). Thus, in response to receiving one or more search terms via the search term input box 212, the media effect system 100 identifies one or more pre-generated media effects that correspond to the one or more search terms.

In at least one embodiment, the media effect system 100 indexes stored pre-generated media effects by creating a table or database that cross-references metadata associated with each pre-generated media effect. For example, the media effect system 100 builds an indexing table of pre-generated media effects by analyzing descriptive metadata associated with each pre-generated media effect, and creating associations among pre-generated media effects that share the same or similar descriptive metadata. Therefore, in response to receiving a particular search term, the media effect system 100 can quickly lookup all pre-generated media effects that are associated with descriptive metadata that corresponds with the particular search term.

As shown in FIG. 2B, the pre-generated media effects 220a-220c are all associated with the search term "Birthday Party." Furthermore, the pre-generated media effects 220a-220c area also associated with additional contextually-based search terms. As mentioned above, the client-computing device 102a can provide the media effect system 100 with contextual information such as, but not limited to, the GPS location of the client-computing device 102a, the application use history associated with the networking system application 104a and other applications, and camera information (e.g., which camera is activated, a camera viewfinder image stream). Thus, in at least one embodiment, the media effect system 100 has determined additional search terms associated with this contextual information. Accordingly, the pre-generated media effects 220a-220c are associated with locations that are near the location of the client-computing device 102a, are places where the user of the client-computing device 102a has visited before, or are the same or similar to pre-generated media effects the user of the client-computing device 102a has previously selected. In this way, the media effect system 100 provides pre-generated media effects that are more likely to appeal the user of the client-computing device 102a.

Additionally, the media effect system 100 can consider contextual information associated with the user of the client-computing device 102a when identifying and providing pre-generated media effects. For example, in at least one embodiment, the networking system application 104a provides a networking system unique identifier associated with the networking system account of the user of the client-computing device 102a to the media effect system 100. With this information, the media effect system 100 can access networking system activity history associated with the user of the client-computing device 102a such as, but not limited to, the user's networking system posts, comments, likes, and events. For example, the media effect system 100 may identify and provide the pre-generated media effect 220c in response to analyzing one of the user's networking system messages that included the text, "Celebrating my birthday tonight at City Cinema 7. Come join me!"

In one or more embodiments, the media effect system 100 can score and rank pre-generated media effects that respond to the received search term based on the contextual information discussed above. For example, in at least one embodiment, the media effect system 100 adds a weighted scalar value to a score for a pre-generated media effect for each identified correlation between the pre-generated media effect's descriptive metadata and the contextual information provided by the client-computing device 102a. Similarly, the media effect system 100 can add an additional weighted scalar value to the pre-generated media effect's score based on the strength of that correlation. Once the media effect system 100 calculates scores for each identified pre-generated media effect that responds to the received search term, the media effect system 100 can provide the scored pre-generated media effects in ranked order within the pre-generated media effect scroll 214.

In at least one embodiment, the media effect system 100 adds extra weight to scores for identified pre-generated media effects that have been previously selected. For example, in some embodiments, the user of the client-computing device 102a may frequently utilize pre-generated media effects related to a particular search term. Thus, a certain pre-generated media effect may have surfaced in previous searches and have been previously selected. In one or more embodiments, the media effect system 100 adds metadata to each pre-generated media effect indicating each time it has been previously selected, such that each time the same pre-generated media effect surfaces, the media effect system 100 can take these previous selections into account.

In one or more embodiments, the pre-generated media effect scroll 214 is horizontally scrollable and the media effect system 100 can provide a number of scored pre-generated media effects in the pre-generated media effect scroll 214 that meet a threshold score. Alternatively, the media effect system 100 may provide all scored pre-generated media effects in the pre-generated media effect scroll 214 in ranked order. In still further embodiments, the media effect system 100 may provide a predetermined number of scored pre-generated media effects in the pre-generated media effect scroll 214.

Also illustrated in FIG. 2B, the media effect system 100 generates and provides one or more dynamic media effects 222a-222c via the dynamic media effect scroll 216. As mentioned above, in one or more embodiments, the media effect system 100 generates dynamic media effects including one or more media assets that are associated with one or more received and/or determined search terms. For example, in addition to storing media effects that are pre-generated by designers, celebrities, and other third parties, the media effect system 100 also generates media effects using stored media assets. In one or more embodiments, the media effect system 100 generates a dynamic media effect by identifying one or more media assets and associating the identified media assets with an identified template or frame, thereby generating a complete dynamic media effect for overlay on a digital media item.

In one or more embodiments, the media effect system 100 begins generating a dynamic media effect by identifying one or more media assets (e.g., graphics, animated elements, masks, text) that respond to the received or otherwise determined one or more search terms. For example, in at least one embodiment, the media effect system 100 indexes and cross-references a collection of media assets into a search table based on the descriptive metadata associated with each media asset. Thus, utilizing this search table, the media effect system 100 can quickly identify a pool of media assets that include descriptive metadata that matches or corresponds to the one or more search terms.

After identifying a pool of media assets that respond to the received one or more search terms, the media effect system 100 utilizes contextual information provided by the client-computing device 102a to score each identified media asset. For example, in response to receiving contextual information such as the GPS location and time associated with the client-computing device 102a, the media effect system 100 can calculate a low score for any media assets that are inappropriate for the current context of the client-computing device 102a. To illustrate, if the search term was "Eating Out," the media effect system 100 may have identified media assets including graphic images of breakfast foods. But in response to the client-computing device 102a providing contextual information indicating that it is located at a restaurant in the evening, the media effect system 100 will calculate a low score for identified media assets that include images of breakfast foods. Similarly, if the provided contextual information indicates that only the front-facing camera of the client-computing device 102a is activated, the media effect system 100 will calculate a low score for media assets with metadata indicating they are inappropriate for "selfie" type digital media items.

In one or more embodiments, the media effect system 100 further weights the score for each identified media asset based on contextual information associated with the user of the client-computing device 102a. For example, contextual information associated with the user of the client-computing device 102a can include, and is not limited to, application usage history information (e.g., the user's activity history relative to the networking system application 104a and other applications installed on the client-computing device 102a), calendar information, contact information, and a networking system unique identifier associated with the user of the client-computing device 102a. In at least one embodiment, the media effect system 100 utilizes the networking system unique identifier to access networking system information associated with the user of the client-computing device 102a. For example, the media effect system 100 can access the user's networking system profile, networking system activity history, and networking system co-user information.

After receiving and otherwise accessing user information associated with the user of the client-computing device 102a, the media effect system 100 weights the calculated score for each identified media asset based on the user information. For example, in one or more embodiments, the media effect system 100 weights the score for a media asset by adding a scalar value to the media asset's score for each identified match or correlation between the media asset's descriptive metadata and the identified user information. Further, in at least one embodiment, the media effect system 100 may add additional weight to certain specific matches or correlations. For instance, if the media asset is an image depicting a cat, the media effect system 100 may add a value of one to the media asset's score in response to determining from the user's networking system information that the user likes cats. If another media asset is a cloud border, the media effect system 100 may add a value of two to this media asset's score in response to determining from the user's application usage history that the user has selected this media asset previously.

Once the media effect system 100 has calculated a weighted score for each identified media asset, the media effect system 100 identifies one or more templates on which to base one or more dynamic media effects. For example, in one or more embodiments, the media effect system 100 stores a collection of templates; each including one or more fields with which a media asset may be associated. In at least one embodiment, each field in a template includes data specifying the type of media asset that may be associated with that field (e.g., "only text elements may be associated with this field"), and the effect associating a media asset with that field will have on the appearance of the finished dynamic media effect (e.g., "this field displays a text input along the bottom of a digital photograph or video"). Accordingly, in at least one embodiment and as no digital media item has been captured or selected at this point, the media effect system 100 can identify templates based on previously selected dynamic media effects.

Next, in one or more embodiments, the media effect system 100 identifies a number of top-scoring media assets. For example, the media effect system 100 can identify a threshold percentage (e.g., ten percent) of the media assets in order starting from the media asset with the highest score. In another embodiment, the media effect system 100 identifies a predetermined number of media assets in order starting from the media asset with the highest score. Regardless of how the media effect system 100 identifies the collection of top-scoring media assets, the media effect system 100 is left with one or more media assets that are highly likely to appeal to the user of the client-computing device 102a.

Following this, the media effect system 100 generates a dynamic media effect by applying a series of rules to the collection of top-scoring media assets to identify a subset of the collection that can work in combination. For example, the media effect system 100 may begin by identifying a template with at least one field that is compatible with the top-scoring media effect. The media effect system 100 can then continue to associate top-scoring media effects with other compatible fields in that template until the template is full. The media effect system 100 can then repeat those steps with the next most top-scoring media effect among the scored media effects.

Alternatively, if the available templates do not include compatibility restrictions, the media effect system 100 may utilize a series of rules help ensure that the media assets are compatible with each other when inserted into the same template. For example, the media effect system 100 can apply rules such as "only one media asset per region of the underlying digital media item," "no overlapping media assets," and so forth. To illustrate, in one example, two of the identified top-scoring media assets overlay text on a top right-hand corner of a digital media item. In light of the rule that only one media asset is allowed per region of the digital media item, the media effect system 100 will only select one of the two media assets for inclusion in a dynamic media effect. In at least one embodiment, the media effect system 100 will select the media asset with the higher score for inclusion in the dynamic media effect.

In one or more embodiments, the media effect system 100 includes various override mechanisms. For example, in one embodiment, the media effect system 100 may include "hard rules" that are considered when selecting media assets for inclusion in a dynamic media effect (e.g., no media assets with explicit content can be included in a dynamic media effect). In another embodiment, the media effect system 100 can include an override setting for promoted content. For example, if an advertiser pays to have a specific media asset promoted to users who meet certain criteria, the media effect system 100 will include the specific media asset in dynamic media effects for users who meet those criteria. To illustrate, in one example, a soft drink company want to promote itself to users who are attending a particular professional basketball game. Accordingly, the media effect system 100 will include the soft drink company's logo in all dynamic media effects for users who are attending that particular professional basketball game.

Thus, returning to FIG. 2B, each of the dynamic media effects 222a-222c in the dynamic media effect scroll 216 include one or more media assets that feature a strong correlation to contextual information associated with the client-computing device 102a and the user of the client-computing device 102a. In one or more embodiments, the media effect system 100 includes the dynamic media effects 222a-222c in the dynamic media effect scroll 216 in ranked order. For example, in at least one embodiment, the media effect system 100 calculates an overall score for a dynamic media effect that is the sum of the calculated scores for each media asset included in the dynamic media effect. In one or more embodiments, the media effect system 100 then provides the dynamic media effects in the dynamic media effect scroll 216 such that the highest scored dynamic media effect is first in the dynamic media effect scroll 216.

In one or more embodiments, the media effect system 100 may not successfully identify any pre-generated media effect and/or media assets that respond to the one or more received or otherwise determined search terms. Thus, in at least one embodiment, the media effect system 100 may generate fallback media effects. In one or more embodiments, a fallback media effect is a media effect the media effect system 100 generates based only on the received search terms (e.g., the words of the search terms) and the other received contextual information. For example, as shown in FIG. 2B, the media effect system 100 generates and provides the fallback media effects 224a-224c via the fallback media effect scroll 218.

In one or more embodiments, the media effect system 100 generates the fallback media effects 224a-224c based on the received one or more search terms. For example, as shown in FIG. 2B, the media effect system 100 generates the fallback media effect 224a as a stylized version of the search term "Birthday Party." Additionally, the media effect system 100 can utilize machine learning to generate additional fallback media effects based on the search term, as well as the contextual information associated with the client-computing device 102a and the user information associated with the user of the client-computing device 102a. For example, the media effect system 100 generates the fallback media effect 224b based on the search term as well as contextual information including the GPS location of the client-computing device 102a, and networking system event information indicating the name of the user of the client-computing device 102a is "Jeff" and it is Jeff's birthday. Further, the media effect system 100 generates the fallback media effect 224c based on the search term as well as the user's networking system profile information indicating the user's date of birth.

In one or more embodiments, the media effect system 100 can score and rank the generated fallback media effects based on contextual information, in any of the methods described above. For example, the media effect system 100 can calculate a higher score for a fallback media effect that is similar to a previously selected fallback media effect. In this way, the media effect system 100 provide fallback media effects to the user of the client-computing device 102a that are likely to appeal to the user.

In response to a detected selection of any of the pre-generated media effects 220a-220c, the dynamic media effects 222a-222c, or the fallback media effects 224a-224c, the media effect system 100 opens the camera viewfinder of the client-computing device and applies the selected media effect to the camera viewfinder display. For example, in response to the detected selection of the pre-generated media effect 220b, the media effect system 100 opens the camera viewfinder display GUI 226 with the overlay 228, as shown in FIG. 2C. As illustrated in FIG. 2C, the media effect system 100 enlarges and shifts portions of the pre-generated media effect 220b so as to fit appropriately within the aspect ratio of the overlay 228. Utilizing the camera viewfinder display GUI 226 with the overlay 228, the user of the client-computing device 102a can take a digital photograph or video as normal. The resulting captured digital media item will include a standard digital photograph or video (e.g., as framed within the camera viewfinder display GUI 226) underlying the overlay 228 including the selected media effect.

FIGS. 2A-2C illustrate an embodiment of the media effect system 100 wherein media effects are identified and dynamically generated prior to the user accessing the camera viewfinder display of the client-computing device 102a. In other embodiments, the media effect system 100 identifies and dynamically generates media effects in response to the activation of the camera viewfinder display of the client-computing device 102a. For example, as shown in FIG. 3A, the media effect system 100 detects a selection of the camera button 210 adjacent to the communication thread 206 in the communication thread GUI 204.

Figure 3B:
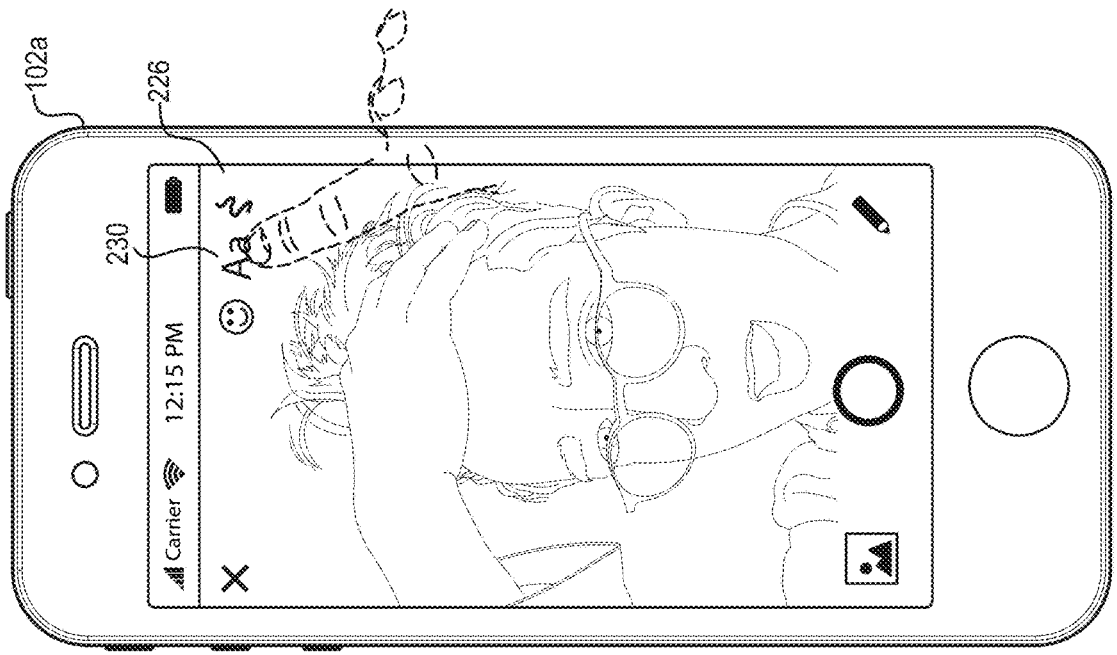
FIGS. 3A-3E illustrate a series of graphical user interfaces that the media effect system can provide in identifying and generating media effects in combination with the camera viewfinder display in accordance with one or more embodiments.
Figure 3A:
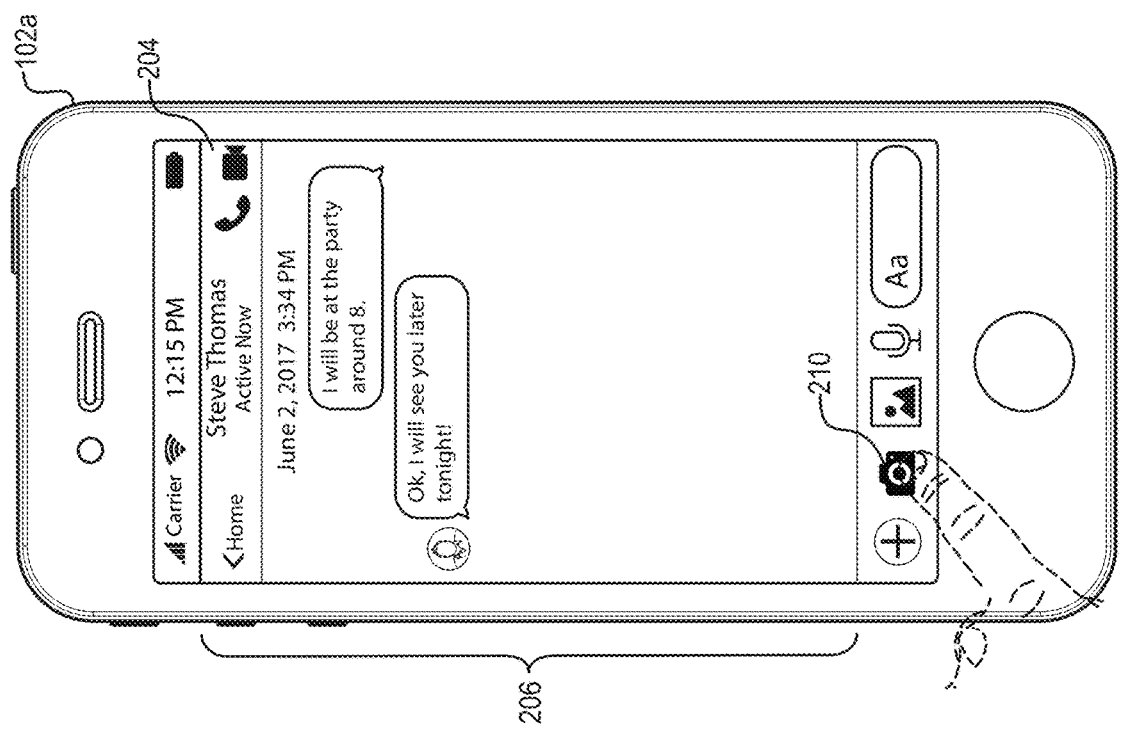

In response to the detected selection of the camera button 210, the media effect system 100 provides the camera viewfinder display GUI 226, as shown in FIG. 3B. In one or more embodiments, the user may input a search term by selecting the text tool button 230, as shown in FIG. 3B, and inputting a search term (e.g., "Birthday Party") into the search term input 234 in the text input overlay 232, as shown in FIG. 3C. In response to a detected selection of the return button 236, as shown in FIG. 3C, the media effect system 100 identifies one or more pre-generated media effects, generates one or more dynamic media effects, and generates one or more fallback media effects in any of the ways described above with reference to FIGS. 2A-2C.

In at least one embodiment, however, the media effect system 100 further considers characteristic information associated with the camera viewfinder image feed when identifying pre-generated media effects and media assets, and when calculating and weighting scores. For example, in one or more embodiments, the media effect system 100 utilizes computer vision techniques (e.g., facial recognition, object analysis) to identify persons, landmarks, buildings, animals, and other objects within an image frame taken from the camera viewfinder image feed provided by the client-computing device 102a. The media effect system 100 can utilize this characteristic analysis to further determine additional search terms, to inform or weight a calculated score for a particular media effect or media asset, to a select an appropriate template, and to rank identified and generated media effects. In one or more embodiments, the media effect system 100 performs the characteristic analysis in connection with an image frame taken from the camera viewfinder image feed at regular intervals (e.g., every 2 seconds) in order to provide the most relevant media effects. Thus, if the user of the client-computing device 102a points the active camera of the client-computing device 102a at a different subject, the media effect system 100 can dynamically update the provided media effects.

Figure 3D:
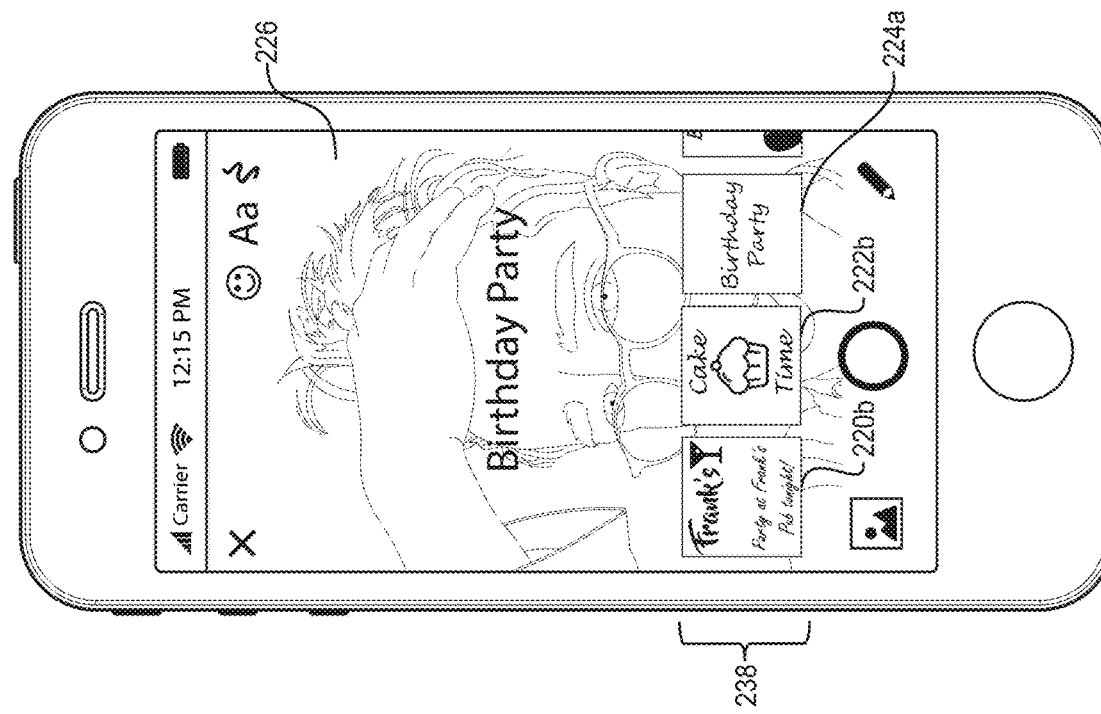
Figure 3C:
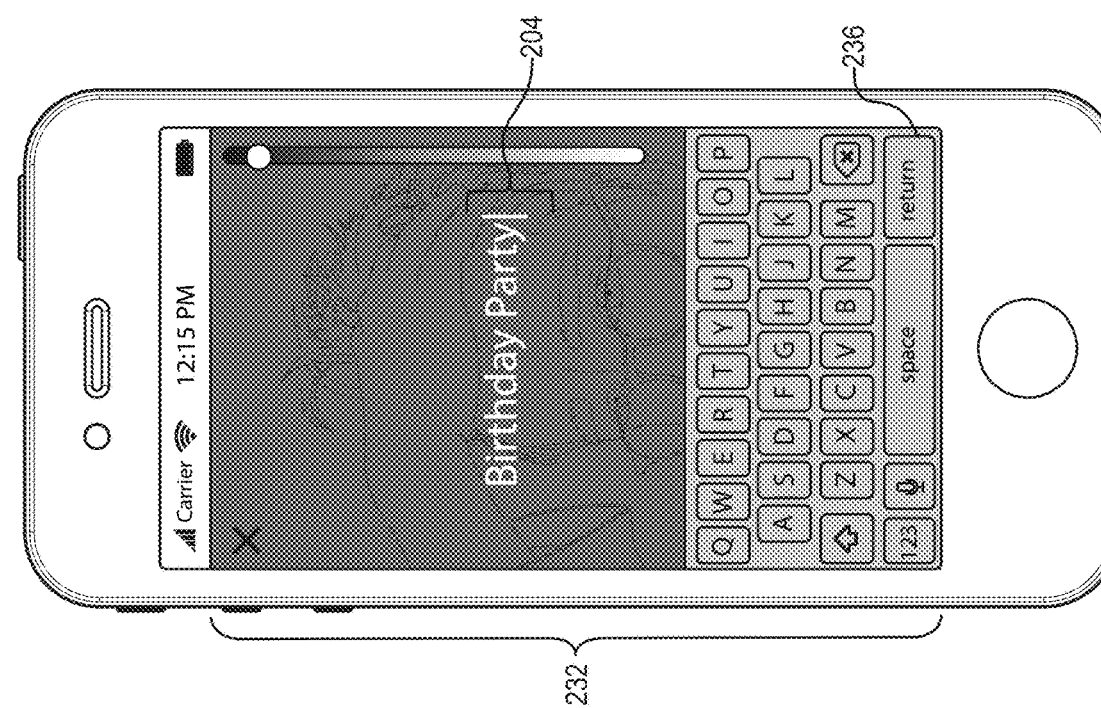

As shown in FIG. 3D, in one or more embodiments, the media effect system 100 provides the pre-generated and generated media effects in a horizontal media effect scroll 238 overlaid on the camera viewfinder display GUI 226. In at least one embodiment, the media effect system 100 provides the pre-generated media effects, the dynamic media effects, and the fallback media effects in a single horizontal media effect scroll 238, rather than separated by type as shown in FIG. 2B.

In one or more embodiments, the media effect system 100 provides the pre-generated media effect 220b, the dynamic media effect 222b, and the fallback media effect 224a in the horizontal media effect scroll 238 based on each media effect's calculated score. As discussed above, the media effect system 100 can calculate scores for media effects based on a variety of considerations and correlations. For example, the media effect system 100 can calculate a score for a pre-generated media effect based on the strength of one or more correlations between the pre-generated media effect's descriptive metadata and contextual information associated with the client-computing device 102a and/or characteristic information associated with an image frame taken from the camera viewfinder image feed provided by the client-computing device 102a. Also, as described above, the media effect system 100 calculates an overall score for a dynamic media effect by adding together the calculated scores for each of the one or more media assets within the dynamic media effect. Similarly, the media effect system 100 can calculate a score for a fallback media effect that reflects the strength of a correlations between the word or phrase illustrated in the fallback media effect and the contextual and characteristic information discussed above.

In one or more embodiments, the media effect system 100 can further weight the score of the media effects in the horizontal media effect scroll 238 based on an analysis of the image feed within the camera viewfinder display GUI 226. For example, the media effect system 100 can utilize computer vision and other techniques to perform facial recognition analysis, object analysis, and color analysis. Based on the results of these analyses, the media effect system 100 can add additional weight to the calculated scores for each of the media effects in the horizontal media effect scroll 238, where the additional weight reflects how well each media effect overlays on the camera viewfinder display. For example, with reference to FIG. 3D, the media effect system 100 may place a heavier weight on the score of media effects that do not include any display elements placed over the center of a digital media item because the face in the camera viewfinder display GUI 226 is centered in the display. In at least one embodiment, the media effect system 100 dynamically updates the additional weights in real-time such that when the camera of the client-computing device 102a is directed to a different subject, the order of the media effects in the horizontal media effect scroll 238 may change.

Figure 3E:
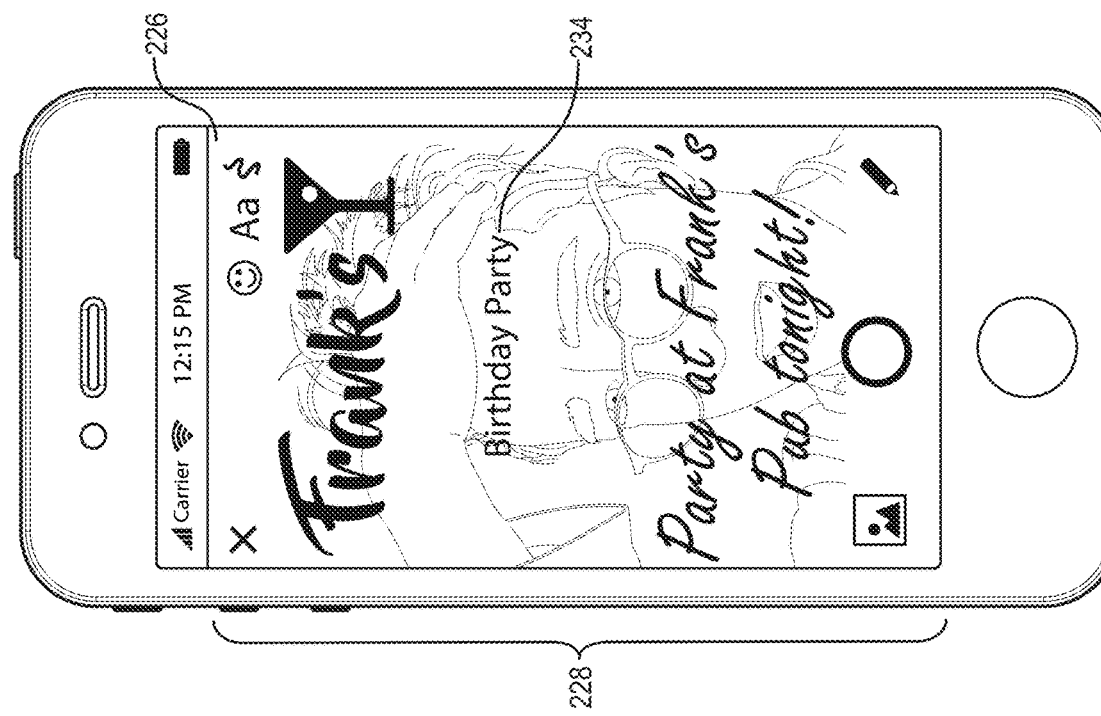

In response to the detected selection of the pre-generated media effect 220b, the media effect system 100 provides the overlay 228 including the pre-generated media effect 220b on the camera viewfinder display GUI 226, as shown in FIG. 3E. In one or more embodiments, the media effect system 100 may continue to display the search term input 234 within the camera viewfinder display GUI 226. At this point, the user may continue to capture a digital media item including the overlay 228, in the manner described above with reference to FIG. 2C.

The embodiment described above with reference to FIGS. 2A-2C illustrates the media effect system 100 providing pre-generated media effects, dynamic media effects, and fallback media effects prior to the user accessing the camera viewfinder display of the client-computing device 102a. Moreover, the embodiment described above with reference to FIGS. 3A-3E illustrates the media effect system 100 providing pre-generated media effects, dynamic media effects, and fallback media effects in combination with the camera viewfinder display prior to the user of the client-computing device 102a capturing a digital media item. In an additional embodiment, the media effect system 100 provides pre-generated media effects, dynamic media effects, and fallback media effects in combination with existing digital media items.

Figure 4B:
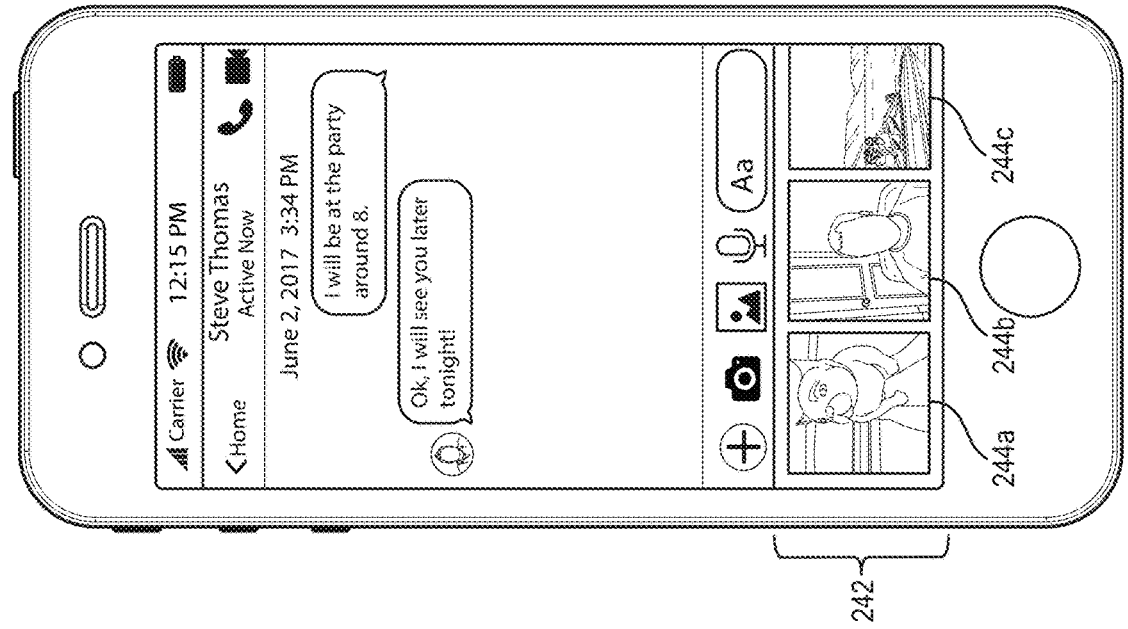
FIGS. 4A-4G illustrate a series of graphical user interfaces that the media effect system can provide in identifying and generating media effects in combination with an existing digital media item in accordance with one or more embodiments.
Figure 4A:
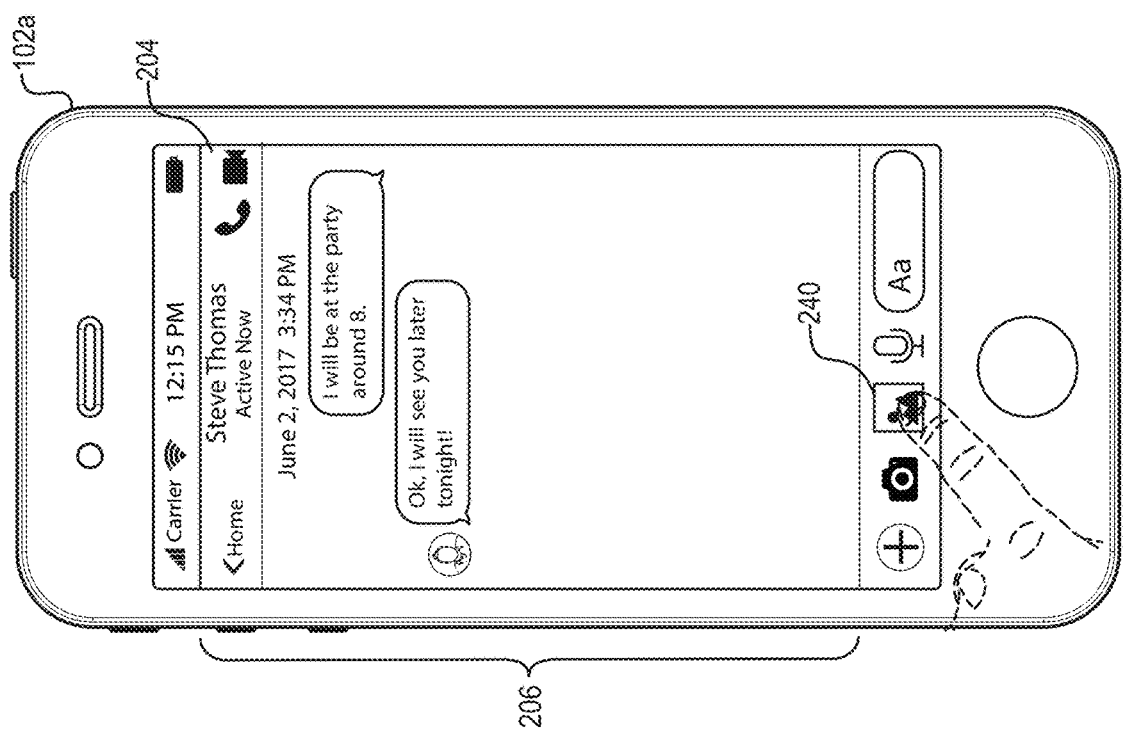

For example, as shown in FIG. 4A, the media effect system 100 detects a selection of the camera roll button 240 adjacent to the communication thread 206 in the communication thread GUI 204. In response to the detected selection of the camera roll button 240, the media effect system 100 provides the camera roll scroll 242 including the digital media item thumbnails 244a, 244b, 244c, as shown in FIG. 4B. In one or more embodiments, the digital media item thumbnails 244a, 244b, and 244c correspond to digital media items (e.g., digital photographs and videos) stored on the client-computing device 102a, or stored in association with the networking system application 104a. In at least one embodiment, the media effect system 100 provides the digital media item thumbnails 244a, 244b, and 244c such that the first digital media item thumbnail in the camera roll scroll 242 corresponds with the most recently captured digital media item, and so on.

In one or more embodiments, the media effect system 100 enables the user to edit stored digital media items. For example, as shown in FIG. 4C, in response to a detected selection of the digital media item thumbnail 244a, the media effect system 100 provides the edit button 246 and the send button 248. In response to a detected selection of the send button 248, the media effect system 100 immediately sends the digital media item corresponding to the digital media item thumbnail 244a as an electronic message within the communication thread 206. In response to a detected selection of the edit button 246, the media effect system 100 provides various editing capabilities to the user of the client-computing device 102a.

Figure 4D:
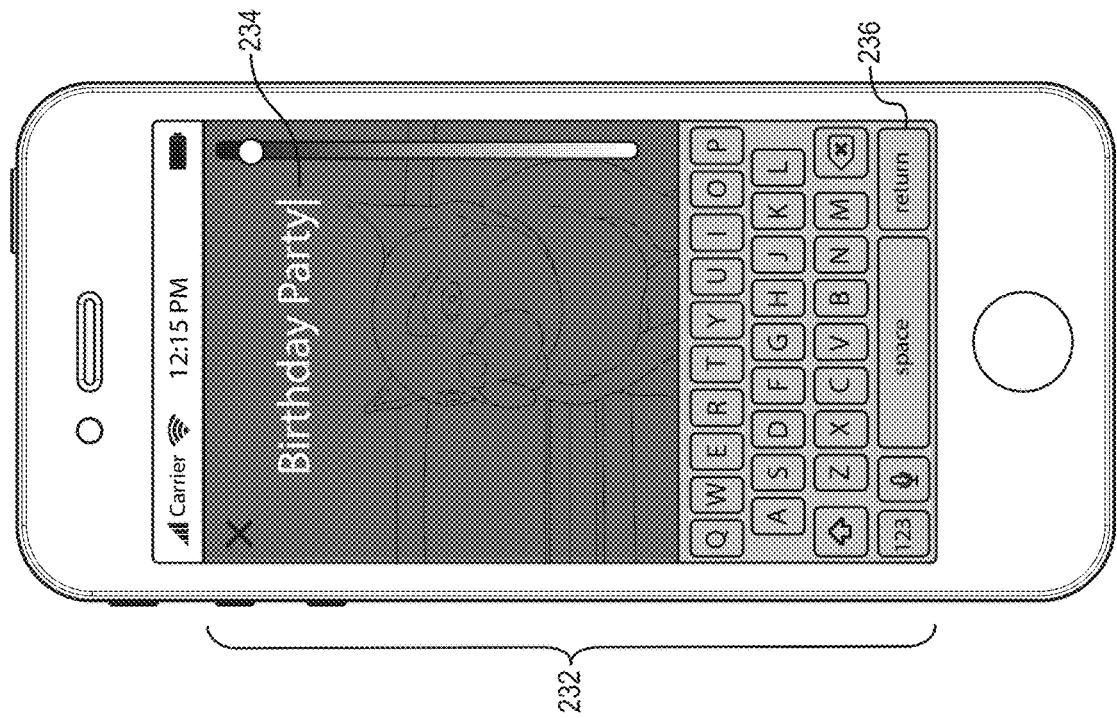
Figure 4C:
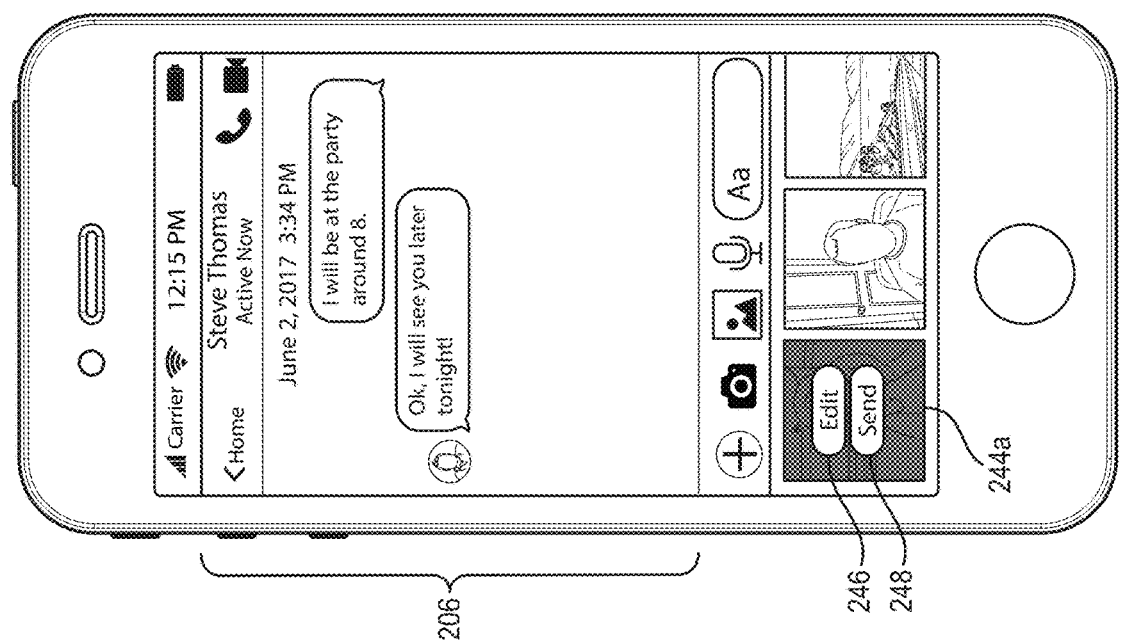

For example, in one or more embodiments and as illustrated in FIG. 4D, in response to a detected selection of the edit button 246, the media effect system 100 provides the text input overlay 232 where the user of the client-computing device 102a can provide the search term input 234. In at least one embodiment, in response to receiving the search term input 234 and detecting a selection of the return button 236, the media effect system 100 identifies one or more pre-generated media effects and generates one or more dynamic media effects in any of the ways described above with regard to contextual information. In the embodiment illustrated in FIGS. 4A-4G, however, the media effect system 100 further takes into consideration characteristic information associated with the digital media item associated with the selected digital media item thumbnail (e.g., the digital media item thumbnail 244a). For example, as discussed above, the media effect system 100 can utilize computer vision techniques in connection with the selected digital media item to determine the identity of one or more persons in the digital media item, the name of places depicted in the digital media item, and information about animals and other objects depicted in the digital media item. The media effect system 100 can utilize this characteristic analysis in connection with the digital media item to determine additional search terms, to inform or weight a calculated score for a particular media effect or media asset, to a select an appropriate template, and to rank identified and generated media effects.

Figure 4F:
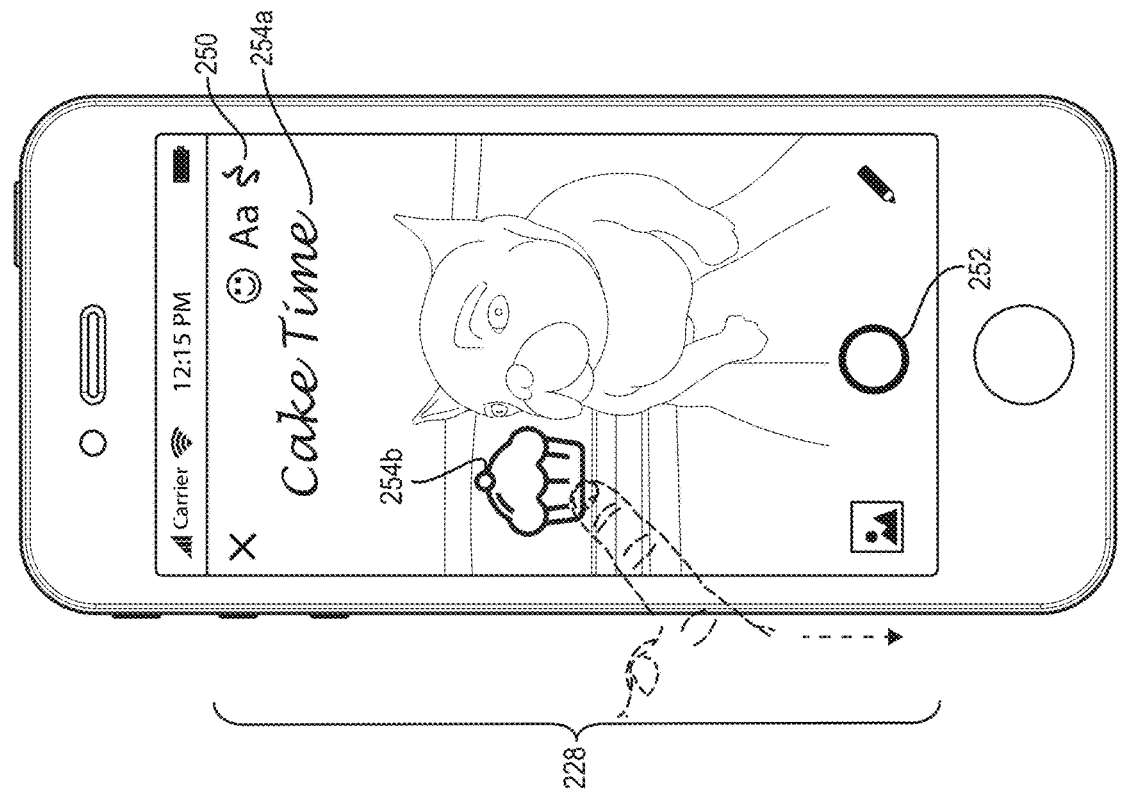
Figure 4E:
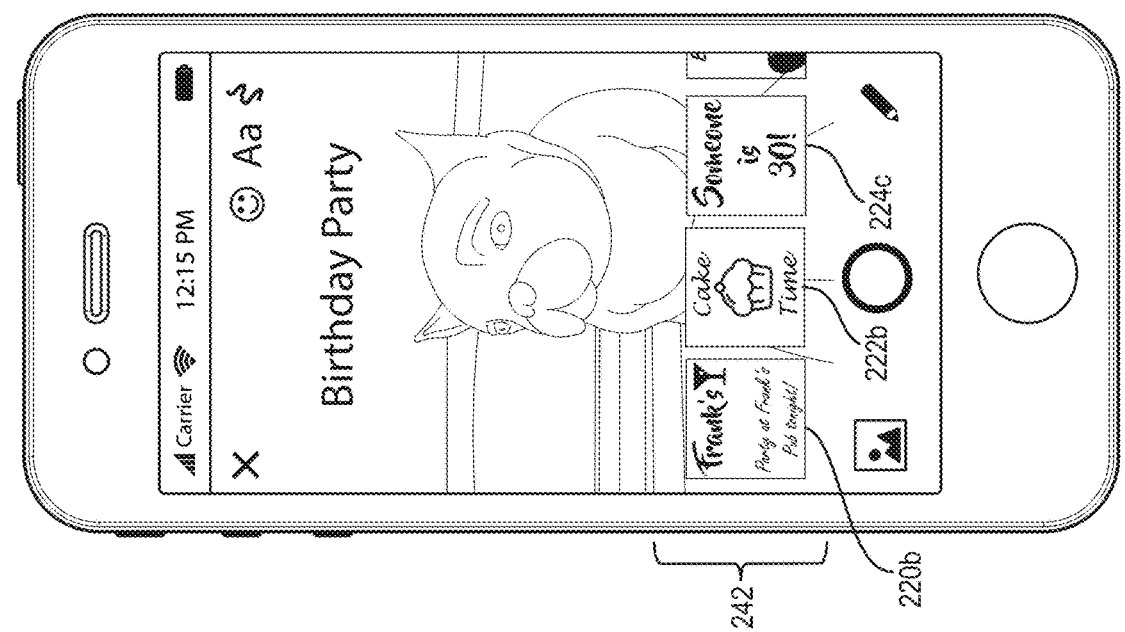

Further, as shown in FIG. 4E, the media effect system 100 also scores, ranks, and provides the identified and generated media effects in the horizontal media effect scroll 238, in the same manner described above with reference to FIG. 3D, further taking into consideration the characteristic information associated with the digital media item, as just discussed. For example, as shown in FIG. 4E, the media effect system 100 provides the pre-generated media effect 220b, the dynamic media effect 222b, and the fallback media effect 224c in the horizontal media effect scroll 238 in ranked order.

In response to a detected selection of any of the media effects listed in the horizontal media effect scroll 238, the media effect system 100 provides an overlay of the selected media effect on the digital media item associated with the selected digital media item thumbnail. For example, as shown in FIG. 4F, in response to the detected selection of the dynamic media effect 222b, the media effect system 100 provides the digital media item display GUI 250 (e.g., displaying the digital media item associated with the selected digital media item thumbnail 244a) with the overlay 228 including the selected dynamic media effect 222b.

As mentioned above, in one or more embodiments, the media assets included in a dynamic media effect can be individually edited. For example, as shown in FIG. 4F, the media effect system 100 enables the user to move the media assets 254a, 254b within the overlay 228 with one or more touch gestures. In addition to repositioning media assets, the media effect system 100 enables the user to alter size, color, font, opacity, and other display features of one or more media assets.

Figure 4G:
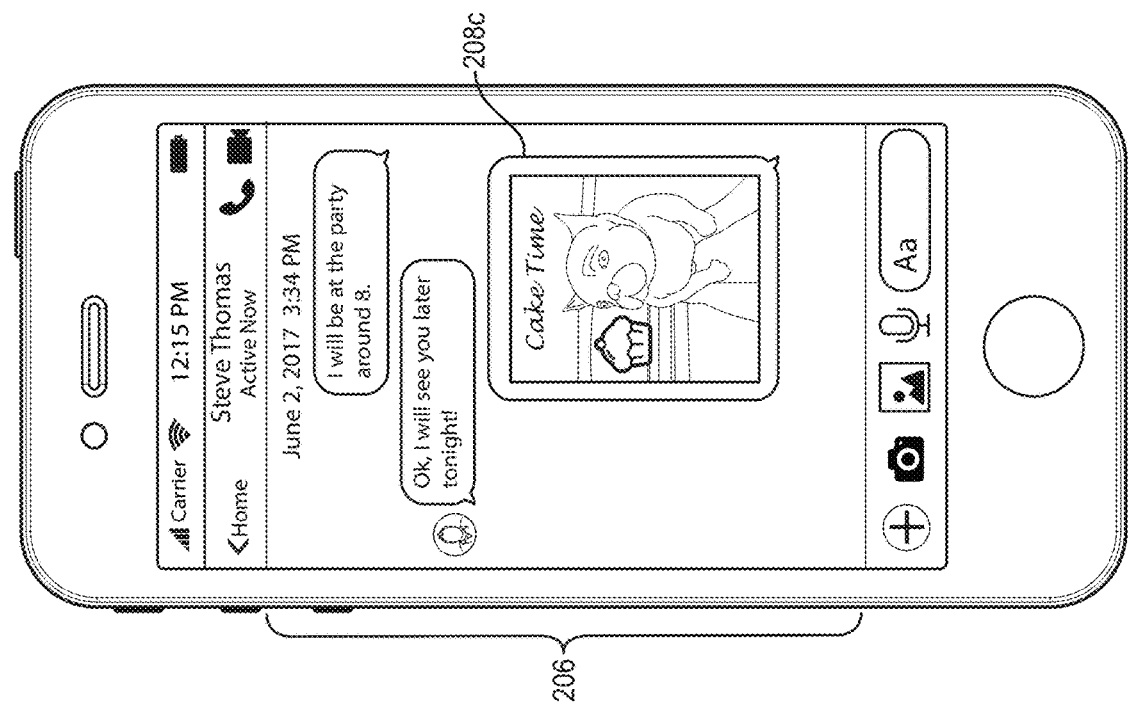

In response to a detected selection of the finished button 252, the media effect system 100 generates and sends an electronic communication including the selected digital media item overlaid with the selected (and potentially edited) media effect. For example, as shown in FIG. 4G, the media effect system 100 generates and sends the electronic communication 208c including the selected digital media item overlaid with the edited media effect, described above. As soon as the media effect system 100 sends the electronic communication 208c, the media effect system 100 adds the electronic communication 208c to the communication thread 206.

Figure 5:
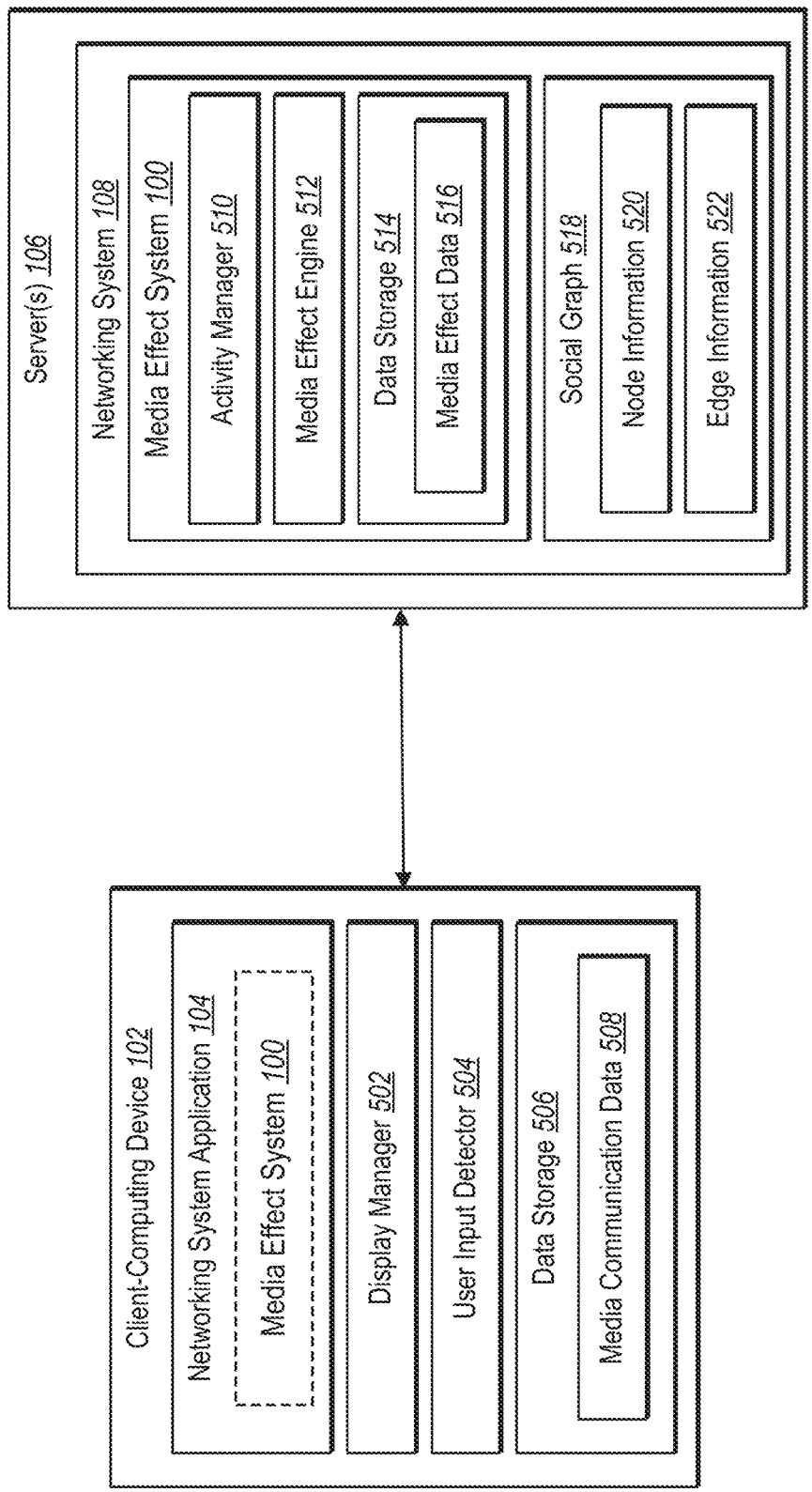
FIG. 5 illustrates a detailed schematic diagram of the media effect system in accordance with one or more embodiments.

FIG. 5 illustrates a schematic diagram illustrating an example embodiment of the media effect system 100. As shown in FIG. 1, the media effect system 100 is implemented by the networking system 108 on the server(s) 106, is communicatively connected to one or more client-computing devices 102 (e.g., the client-computing devices 102a, 102b as shown in FIG. 1), and includes various components for performing the processes and features described herein. As shown in FIG. 5, the client-computing device 102 including the networking system application 104, a display manager 502, a user input detector 504, and a data storage 506 including media communication data 508. Also, shown in FIG. 5, the server(s) 106 hosts the networking system 108 that includes the media effect system 100 including an activity manager 510, a media effect engine 512, and a data storage 514 including media effect data 516. The networking system 108 also includes a social graph 518 including node information 520 and edge information 522. In some embodiments, as indicated by the dashed line, the networking system application 104 can include the media effect system 100 rather than the networking system 108.

In at least one embodiment, the media effect system 100 accesses the networking system 108 in order to identify and analyze social networking system user data. Accordingly, as shown in FIG. 5, the networking system 108 includes the social graph 518 for representing a plurality of users, actions, and concepts. For example, in one or more embodiments, the social graph 518 is accessible by the networking system 108. In one or more embodiments, the social graph 518 includes node information 520 and edge information 522. Node information 520 of the social graph 518 stores information including, for example, nodes for users and nodes for repositories. Edge information 520 of the social graph 518 stores information including relationship between nodes and/or actions occurring within the networking system 108. Further details regarding the networking system 108, the social graph 518, edges, and nodes are presented below with respect to FIG. 9.

Each of the components 100, 104, and 502-508 of the client-computing device 102, and the components 100, and 510-522 of the networking system 108, can be implemented using a computing device including at least one processor executing instructions that cause the media effect system 100 to perform the processes described herein. In some embodiments, the components of the media effect system 100 can be implemented by the server(s) 106, or across multiple server devices. Alternatively, a combination of one or more server devices and one or more client devices can implement the components of the media effect system 100. Additionally, the components of the media effect system 100 can comprise a combination of computer-executable instructions and hardware.

In one or more embodiments, the networking system application 104 is a native application installed on the client-computing device 102. For example, the networking system application 104 can be mobile application that install and run on a mobile device, such as a smart phone or tablet computer. Alternatively, the networking system application 104 can be desktop application, widget, or other form of a native computer program. Furthermore, the networking system application 104 may be a remote application accessed by the client-computing device 102. For example, the networking system application 104 may be web applications that are executed within a web browser of the client-computing device 102.

As mentioned above, and as shown in FIG. 5, the client-computing device 102 includes the networking system application 104. In one or more embodiments, the networking system application 104 enables the user of the client-computing device 102 to interact with one or more features of the networking system 108. Further, in one or more embodiments, the networking system application 104 enables the user of the client-computing device 102 to interact with one or more features of the media effect system 100. For example, the networking system application 104 enables the user of the client-computing device 102 to scroll through a newsfeed, read posts, compose electronic messages, capture digital photographs and videos, and otherwise interact with the networking system 108.

Additionally, in one or more embodiments, the networking system application 104 also collects contextual information from the client-computing device 102 and provides the collected information to the networking system 108. For example, in one or more embodiments, the networking system application 104 accesses system files, application usage files, and other system information to identify GPS data (e.g., global positioning satellite data), camera viewfinder data, gyroscopic data, application usage data, and a networking system unique identifier associated with the user of the client-computing device 102. The networking system application 104 then provides this data to the networking system 108 for use in determining one or more search terms, calculating scores, and so forth.

Furthermore, in one or more embodiments, the networking system application 104 also provides image frames (e.g., from the camera viewfinder image feed) and captured digital media items to the networking system 108 along with user-provided search terms. For example, in response to a detected capture of a digital photograph, the networking system application 104 can provide the captured digital photograph to the networking system 108 for analysis. Similarly, in response to detecting a search term provided by the user of the client-computing device 102, the networking system application 104 provides the search term to the networking system 108 for use in determining one or more search terms, calculating scores, and the other operations discussed above.

Also shown in FIG. 5, the client-computing device 102 includes the display manager 502. In one or more embodiments, the display manager 502 generates, provides, manages, and/or controls one or more graphical user interfaces that allow a user to interact with features of the media effect system 100. For example, the display manager 502 generates a graphical user interface ("GUI") that includes a digital media item preview display along with other selectable controls. In at least one embodiment, the display manager 502 further overlays one or more selected media effects on the digital media item display in order to provide a preview of how the media effect looks in combination with the captured photograph or video. The display manager 502 can additionally generate other GUIs that assist a user in creating a multimedia communication and sending the multimedia communication to others.

More specifically, the display manager 502 facilitates the display of a graphical user interface. For example, the display manager 502 may compose the graphical user interface of a plurality of graphical components, objects, and/or elements that allow a user to engage with features of the media effect system 100. More particularly, the display manager 502 may direct a client-computing device to display a group of graphical components, objects, and/or elements that enable a user to interact with various features of the media effect system 100.

In addition, the display manager 502 directs a client-computing device to display one or more graphical objects, controls, or elements that facilitate user input for interacting with various features of the media effect system 100. To illustrate, the display manager 502 provides a graphical user interface that allows a user to edit multimedia. The display manager 502 also facilitates the input of text or other data for the purpose of interacting with one or more features of the media effect system 100. For example, the display manager 502 provides a GUI that that functions in connection with a touch screen. A user can interact with the touch screen using one or more touch gestures to preview media effects, input text, manipulate displays, and so forth.

Furthermore, the display manager 502 is capable of transitioning between two or more GUIs. For example, in one embodiment, the display manager 502 provides a digital media item preview display. Later, in response to detected input from the user, the display manager 502 transitions to a second GUI that includes a listing of sharing options.

As shown by the dotted-lines in FIG. 5, optionally, the networking system application 104 includes the media effect system 100. For example, in one or more embodiments, the networking system application 104 implemented by the client-computing device 102 comprises the activity manager 510, media effect engine 512, and optionally the data store 514 and media effect data 516. Thus, in one or more embodiments, the methods described herein above can be implemented locally by the client-computing device 102. Alternatively, as described below, the server(s) 106 can implement the media effect system 100.

As further illustrated in FIG. 5, the media effect system 100 includes the user input detector 504. In one or more embodiments, the user input detector 504 detects, receives, and/or facilitates user input. In some examples, the user input detector 504 detects one or more user interactions with respect to a user interface or GUI. As referred to herein, a "user interaction" means a single interaction, or combination of interactions, received from a user by way of one or more input devices. For example, the user input detector 504 detects a user interaction from a keyboard, mouse, touch page, touch screen, and/or any other input device. In the event the client-computing device includes a touch screen, the user input detector 504 detects one or more touch gestures (e.g., swipe gestures, tap gestures, pinch gestures, reverse pinch gestures) from a user that forms a user interaction. In some examples, a user can provide the touch gestures in relation to and/or directed at one or more graphical objects or graphical elements of a user interface or GUI.

The user input detector 504 may additionally, or alternatively, receive data representative of a user interaction. For example, the user input detector 504 may receive one or more user configurable parameters from a user, one or more commands from the user, and/or other suitable user input. The user input detector 504 may receive input data from one or more components of the media effect system 100 or from one or more remote locations.

The media effect system 100 performs one or more functions in response to the user input detector 504 detecting user input and/or receiving other data. Generally, a user can control, navigate within, and otherwise use the media effect system 100 by providing one or more user inputs that the user input detector 504 can detect.

As illustrated in FIG. 5, the client-computing device 102 also includes the data storage 506. The data storage 506 includes media communication data 508. In one or more embodiments, media communication data 508 includes media communication information, such as described herein.

As shown in FIG. 5, and as mentioned above, the server(s) 106 hosts the networking system 108. In one or more embodiments, the networking system 108 provides communication threads, live video broadcasts, digital media items, networking system posts, electronic messages, and other networking system features to one or more networking system users (e.g., by way of a newsfeed, a communication thread, an ephemeral content collection, a timeline, a profile, a "wall," a live video broadcast display). Additionally, the networking system 108 includes the social graph 518, as described above. As further illustrated in FIG. 5, and as mentioned above, the networking system 108 includes the media effect system 100 including an activity manager 510, a media effect engine 512, and a data storage 514 storing media effect data 516.

In one or more embodiments, the activity manager 510 monitors networking system activity associated with the user of the client-computing device 102. For example, as discussed above, the media effect system 100 utilizes networking system activity information associated with the user of the client-computing device 102 to determine contextual information associated with the client-computing device 102. In one or more embodiments, the activity manager 510 monitors the user's networking system activity including, but not limited to, the user's clicks, selected media effects, comments, scroll stops, "likes," electronic messages, requests, uploads, shares, and communication threads. Additionally, the activity manager 510 queries monitored activity information associated with the user of the client-computing device 102 and with the user's networking system co-users (e.g., the user's "friends"). For example, the activity manager 510 queries this information based on a specified time period, or a specified type of activity information (e.g., only the user's previously selected media effects).

As shown in FIG. 5, and as mentioned above, the networking system 108 further includes the media effect engine 512. The media effect engine 512 handles all activities related to identifying, generating, scoring, and ranking media effects. In at least one embodiment, the media effect engine 512 provides media effects to the client-computing device 102 and stores copies of provided media effects as part of the media effect data 522.

In one or more embodiments, however, prior to identifying, generating, scoring, and ranking media effects, the media effect engine 512 also builds cross referenced indexes of pre-generated media effects and media assets. For example, as described above, the media effect system 100 utilizes stored pre-generated media effects and stored media assets. Accordingly, the media effect engine 512 builds a cross referenced index of pre-generated media effects by analyzing descriptive metadata associated with a pre-generated media effect and cross referencing pre-generated media effect in the index based on this analysis. In at least one embodiment, the media effect engine 512 builds a cross referenced index of media assets in the same manner based on the descriptive metadata associated with each media asset. In one or more embodiments, the media effect engine 512 periodically adds media effects and media assets, removes media effects and media assets, and updates the cross referencing of the created indexes.

In one or more embodiments, the media effect engine 512 also determines additional search terms. As discussed above, in at least one embodiment, the media effect system 100 utilizes determined search terms in addition to those provided by the user of the client-computing device 102. In one or more embodiments, the media effect engine 512 determines additional search terms based on contextual information associated with the client-computing device 102. For example, in at least one embodiment, the media effect engine 512 utilizes machine learning techniques to analyze contextual information including the location of the client-computing device 102, sensor information associated with the client-computing device 102, and networking system information associated with the user of the client-computing device to determine additional search terms that are descriptive of or associated with the context (e.g., the location, setting, scenario) of the client-computing device 102.

Further, in at least one embodiment, the media effect engine 512 utilizes machine learning techniques to analyze characteristic information associated with an image frame (e.g., taken from a camera viewfinder image feed) or digital media item. For example, the media effect engine 512 utilizes machine learning techniques to perform facial analysis in connection with an image frame or digital media item, to perform object analysis in connection with an image frame or digital media item, or to perform other types of visual analysis in connection with an image frame or digital media item. In one or more embodiments, utilizing the results of these analyses, the media effect engine 512 can determine additional search terms that are descriptive of or associated with the context in which the image frame or digital media item was captured.

In one or more embodiments, the media effect engine 512 identifies pre-generated media effects. For example, in response to receiving a user-provided search term and optionally determining additional search terms, the media effect engine 512 identifies pre-generated media effects by querying a cross referenced index of pre-generated media effects for media effects that are associated with descriptive metadata that matches or corresponds with the user-provided search term and/or the determined additional search terms. Additionally, the media effect engine 512 can identify pre-generated media effects by performing Internet searches, or other lookups based on the user-provided search term and/or the determined additional search terms.

After identifying one or more pre-generated media effects, the media effect engine 512 also calculates a score for each identified pre-generated media effect. For example, in one or more embodiments, the media effect engine 512 calculates a score for an identified pre-generated media effect based on contextual information associated with the client-computing device 102. For instance, the media effect engine 512 calculates the score by adding a scalar value to the score associated with the pre-generated media effect for every identified correlation between the pre-generated media effect's descriptive metadata and the contextual information associated with the client-computing device 102. Furthermore, in at least one embodiment, if an image frame or digital media item is in use, the media effect engine 512 further calculates the score for a pre-generated media effect based on identified correlations between the pre-generated media effect's descriptive metadata and the characteristic information associated with the image frame or digital media item.

Additionally, the media effect engine 512 may weight the scalar value depending on the strength of any identified correlations. For example, if the contextual information indicates the client-computing device 102 is located at Central Park in New York City, and a pre-generated media effect's descriptive metadata states the media effect includes a landmark found in Central Park in New York City, the media effect engine 512 may add a heavy weight to the scalar value added to the score for that pre-generated media effect. Additionally, after calculating a score for each identified pre-generated media effect, the media effect engine 512 can rank the pre-generated media effects based on their calculated scores (e.g., in descending order).

In one or more embodiments, the media effect engine 512 also generates dynamic media effects. For example, in at least one embodiment, the media effect engine 512 begins generated a dynamic media effect by identifying one or more media assets based on contextual information associated with the client-computing device 102. For instance, the media effect engine 512 may query a cross referenced index of media assets based on the user-provided search terms and optionally any determined additional search terms.

In at least one embodiment, the media effect engine 512 also scores the identified media assets based on contextual information associated with the client-computing device 102 and characteristic information associated with the image frame or digital media item (e.g., if one is in use). For example, the media effect engine 512 calculates a score for an identified media asset by analyzing the descriptive metadata associated with the media asset to identify correlations between the descriptive metadata and the contextual information and characteristic information, described above. In at least one embodiment, the media effect engine 512 further weights the calculated score based on the strength of the identified correlations. The end result of the scoring process being a top-scoring media asset that is most applicable to the context of the client-computing device 102 and the visual characteristics of the image frame or digital media item. Accordingly, the media effect engine 512 further ranks the scored media assets in descending order.

With the identified media assets in ranked order, the media effect engine 512 continues to generate a dynamic media effect by identifying one or more media effect templates. As discussed above, a media effect template includes one or more fields that are compatible with a defined type of media asset. In at least one embodiment, a field of a media effect template essentially includes display instructions that dictate how a specific type of media asset is displayed within a digital media item overlay. Accordingly, the media effect engine 512 identifies one or more media effect templates by first identifying a media effect template with at least one fields that is compatible with the top-scoring media asset. The media effect engine 512 can identify additional media effect templates by identifying templates with fields that are compatible with other scored media assets.

Next, in one or more embodiments, the media effect engine 512 generates a dynamic media effect by associating the top-scoring media asset with the compatible fields in the first selected media effect template. If the template includes additional fields, the media effect engine 512 can continue associating the highest scored compatible media assets with the additional fields until all the fields in the template are associated with a media asset. Thus, in this manner, the media effect engine 512 ensures the fields in the first selected media effect template are associated with the highest scoring media assets that are compatible with each field. In at least one embodiment, the media effect engine 512 generates additional dynamic media effects in this manner utilizes the highest scored remaining media assets until all the scored media assets have been associated with a media effect template.

Alternatively, the media effect engine 512 may generate a dynamic media effect without a media effect template. For example, the media effect engine 512 may utilize various rules, grammars, and algorithms to combine groups of media assets into dynamic media effects. In at least one embodiment, the media effect engine 512 strives to combine as many top-scoring media assets into the first dynamic media effect, while obeying the pre-defined rules (e.g., "only one border media asset per media effect," "only one mask media asset per media effect").

Furthermore, in one or more embodiments, the media effect engine 512 calculates an overall score for each of the generated dynamic media effects. For example, in one embodiment, the media effect engine 512 calculates a dynamic media effect's overall score by adding together the previously calculated scores associated with each media asset that makes up the dynamic media effect. Alternatively, the media effect engine 512 may calculate a dynamic media effect's overall score based on the contextual information associated with the client-computing device 102 and optionally on the characteristic information associated with an image frame or digital media item, in the manner discussed above. In at least one embodiment, the media effect engine 512 also ranks the generated dynamic media effects based on their overall scores.

In one or more embodiments, the media effect engine 512 also generates one or more fallback media effects. As discussed above, in some embodiments, the media effect engine 512 may fail to identify and pre-generated media effects or media assets that respond to the user-provided search term and/or the determined additional search terms. Accordingly, the media effect engine 512 can generate one or more media effects based on the text of the search terms, and/or on the contextual information associated with the client-computing device 102 and characteristic information associated with the image frame or digital media item.

For example, the media effect engine 512 generates a fallback media effect based on the text of a search term by creating a stylized version of the search term within an overlay. In at least one embodiment, the media effect engine 512 can utilize characteristic information associated with the image frame or digital media item to determine the appropriate color, placement, opacity, etc. for the stylized version of the search term within the overlay. Furthermore, the media effect engine 512 can generate a fallback media effect based on contextual information associated with the client-computing device 102 and characteristic information associated with the image frame or digital media item in a similar manner by utilizing machine learning to determine appropriate words that describe the contextual and/or characteristic information and creating stylized versions of the determined words within one or more overlays.

The media effect engine 512 can also calculate scores and rankings for the generated fallback media effects based on the contextual and/or characteristic information in any of the manners described above. In at least one embodiment, the media effect engine 512 only generates one or more fallback media effects in response to determining that no pre-generated media effects and no media assets respond to the one or more search terms. Alternatively, the media effect engine 512 may always generate a threshold number of fallback media effects regardless of the results of the one or more search terms.

As illustrated in FIG. 5, and as mentioned above, the networking system 108 further includes the data storage 514. The data storage 514 includes media effect data 516. In one or more embodiments, media effect data 516 includes media effect information, such as described herein.

Figure 6:
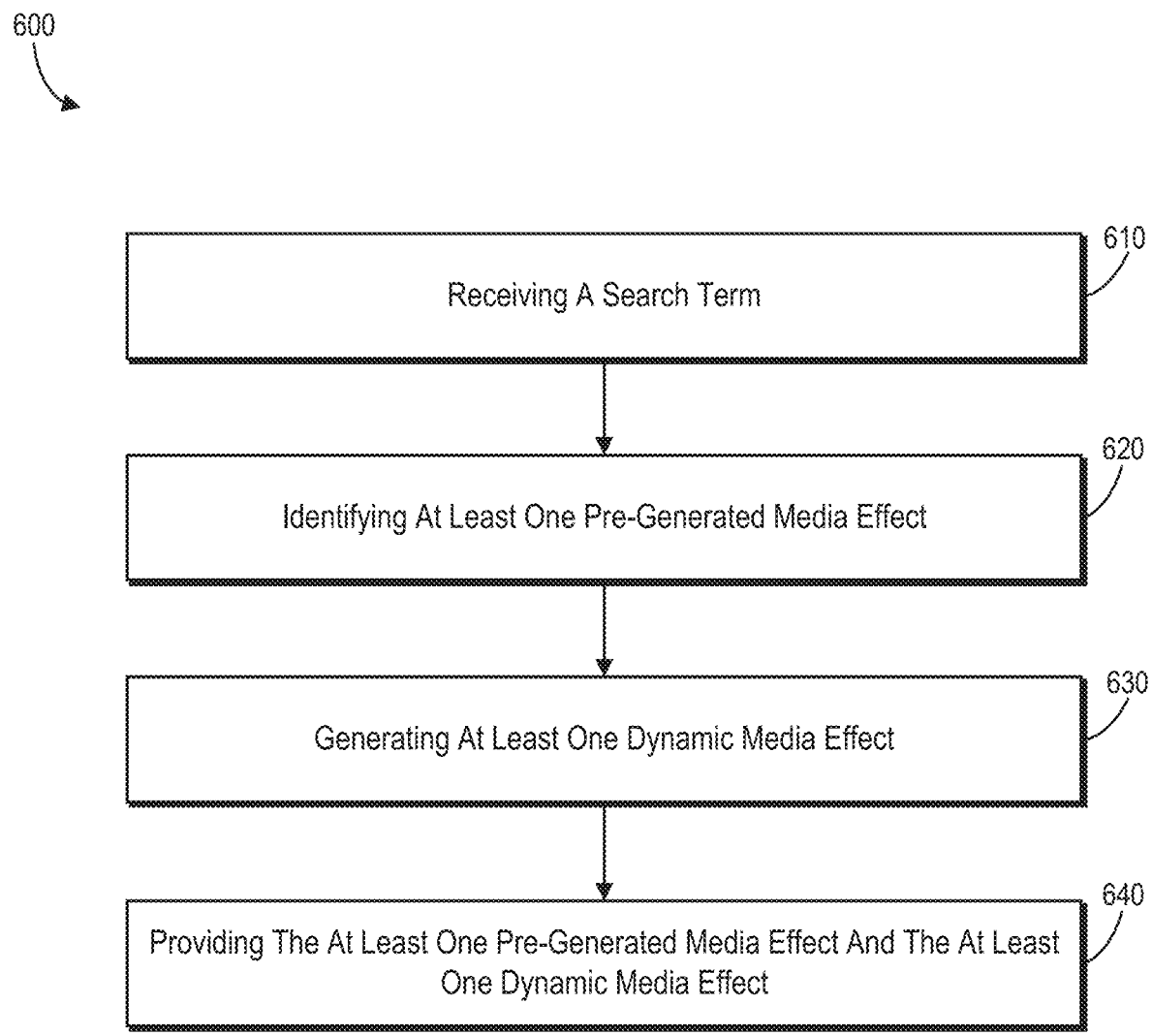
FIG. 6 illustrates a flowchart of a series of acts for providing identified and generated media effects in accordance with one or more embodiments.

Turning now to FIG. 6, this figure illustrates a flowchart of a series of acts 600 for providing customized media effects in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions, that when executed by one or more processors, cause a computing device to perform the acts of FIG. 6. In still further embodiments, a system can perform the acts of FIG. 6.

As shown in FIG. 6, the series of acts 600 includes an act 610 of receiving a search term. In particular, the act 610 can involve receiving, from a client-computing device, a search term in connection with providing a customized media effect for overlay on a digital media item. For example, receiving the search term can include receiving a user-provided search term from the client-computing device.

In one or more embodiments, the series of acts 600 further includes acts including receiving contextual information associated with the client-computing device, receiving characteristic information associated with the digital media item, and determining one or more additional search terms in connection with providing the customized media effect based on one or more of contextual information associated with the client-computing device or characteristic information associated with the digital media item. For example, in one or more embodiments, contextual information associated with the client-computing device includes one or more of: location information associated with the client-computing device, client-computing device sensor information, or networking system information associated with the user of the client-computing device. Additionally, in one or more embodiments, characteristic information associated with the digital media item includes one or more of: facial analysis information associated with the digital media item, object analysis information associated with the digital media item, or visual analysis information associated with the digital media item.

The series of acts 600 further includes an act 620 of identifying at least one pre-generated media effect. In particular, the act 620 can involve identifying at least one pre-generated media effect based on the received search term. In one or more embodiments, identifying the at least one pre-generated media effect is further based on one or more additional search terms. For example, identifying the at least one pre-generated media effect can include accessing, within a cross referenced index of pre-generated media effects, a pre-generated media effect that correlates with one or more of the received search term or the one or more additional search terms. Additionally, in at least one embodiment, the series of acts 600 includes an act of generating a score for the at least one pre-generated media effect based on one or more of the contextual information associated with the client-computing device, or the characteristic information associated with the digital media item.

Additionally, the series of acts 600 includes an act 630 of generating at least one dynamic media effect. In particular, the act 630 can involve generating at least one dynamic media effect including one or more media assets associated with the received search term. In one or more embodiments, generating the at least one dynamic media effect is further based on one or more additional search terms. For example, generating the at least one dynamic media effect including one or more media assets associated with the received search term includes: identifying, within a cross referenced index of media assets, one or more media assets associated with descriptive metadata that correlates with one or more of the received search term or the one or more additional search terms; generating a score for each of the one or more media assets based on one or more of the contextual information associated with the client-computing device or characteristic information associated with the digital media item; identifying, from the scored one or more media assets, a top-scoring media asset; and generating the at least one dynamic media effect including the at least one top-scoring media asset. In at least one embodiment, generating the at least one dynamic media effect including the at least one top-scoring media asset includes: identifying a media effect template including at least one field that is compatible with the at least one top-scoring media asset; and associating the at least one top-scoring media asset with the at least one field in the identified media effect template.

In one or more embodiments, the series of acts 600 includes an act of determining no pre-generated media effects and no media assets respond to the received search term. For example, the series of acts 600 can also include an act of generating a fallback media effect associated with one or more of the search term, the one or more additional search terms, the contextual information associated with the client-computing device, or the characteristic information associated with the digital media item.

The series of acts 600 also includes an act 640 of providing the at least one pre-generated media effect and the at least one dynamic media effect. In particular, the act 640 can involve providing, to the client-computing device, the at least one pre-generated media effect and the at least one dynamic media effect. In one or more embodiments, the series of acts 600 further includes an act of ranking the at least one pre-generated media effect and the at least one dynamic media effect based on the contextual information associated with the client-computing device and the characteristic information associated with the digital media item. For example, in at least one embodiment, providing the at least one pre-generated media effect and the at least one dynamic media effect includes providing the at least one pre-generated media effect and the at least one dynamic media effect in ranked order.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
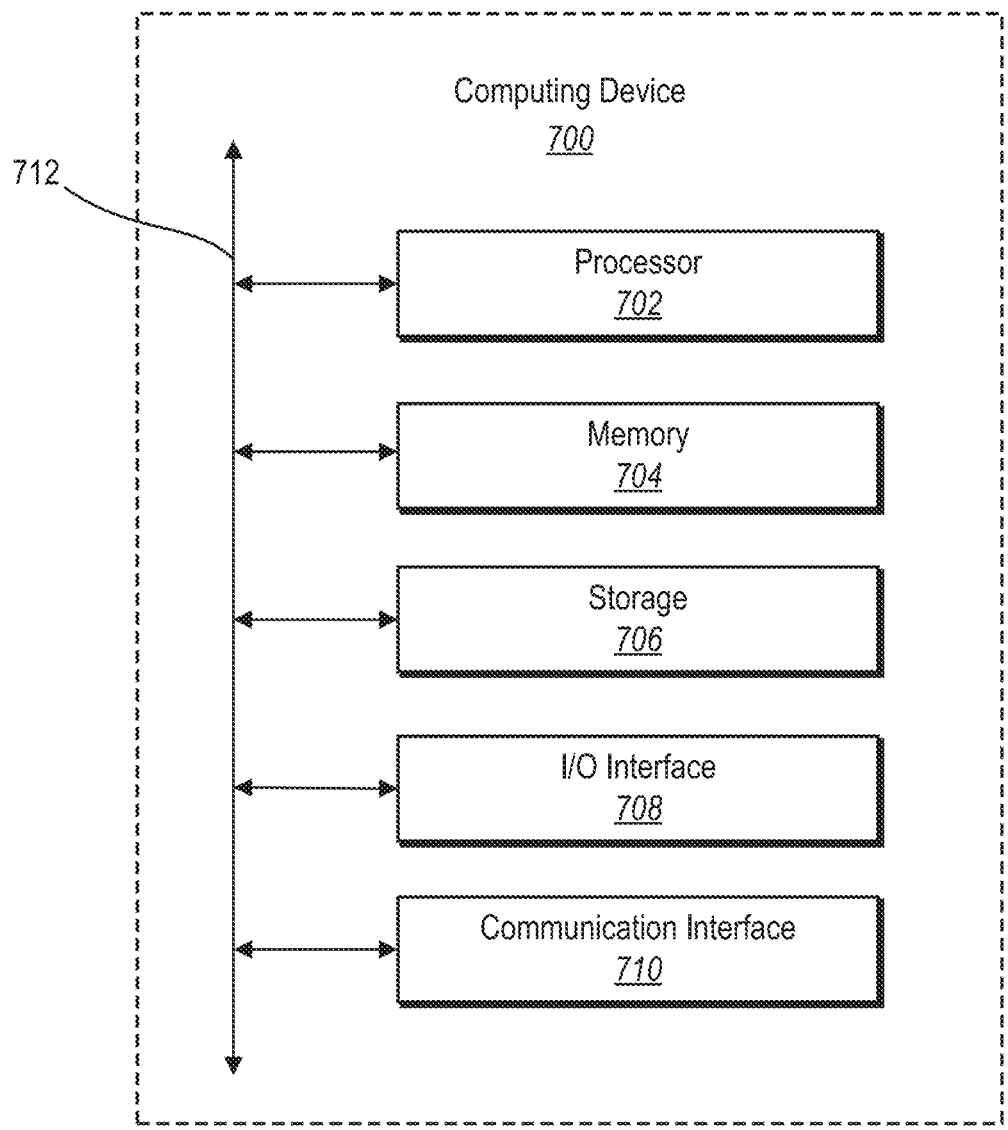
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the media effect system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7.

Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage device 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA)

bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the media effect system 100 can be implemented by a networking system 108. In one or more embodiments, the networking system comprises a social networking system. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and may construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
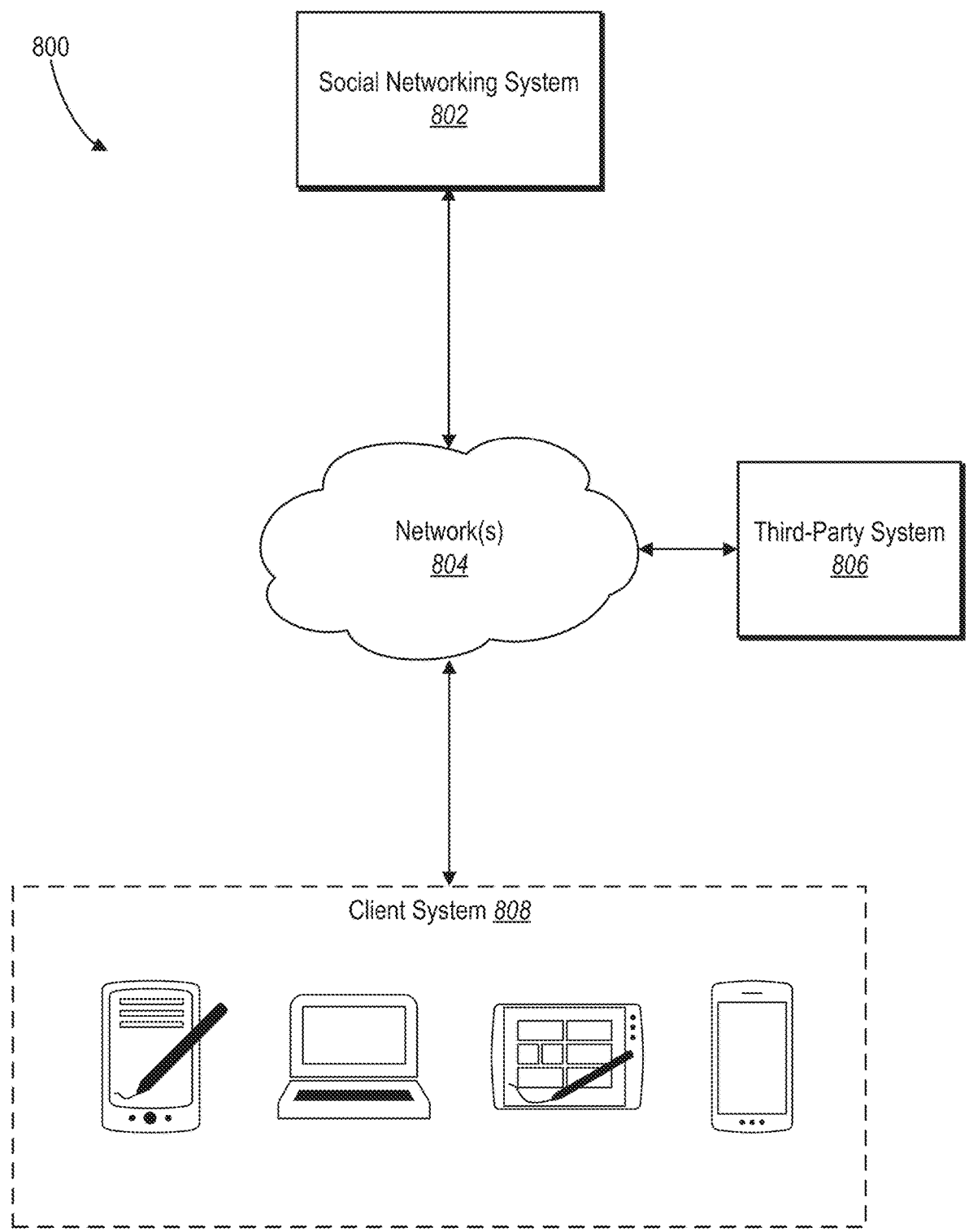
FIG. 8 is an example network environment of a social networking system in accordance with one or more embodiments.

FIG. 8 illustrates an example network environment 800 of a social networking system. Network environment 800 includes a client device 806, a networking system 802 (e.g., a social networking system and/or an electronic messaging system), and a third-party system 808 connected to each other by a network 804. Although FIG. 8 illustrates a particular arrangement of client device 806, networking system 802, third-party system 808, and network 804, this disclosure contemplates any suitable arrangement of client device 806, networking system 802, third-party system 808, and network 804. As an example and not by way of limitation, two or more of client device 806, networking system 802, and third-party system 808 may be connected to each other directly, bypassing network 804. As another example, two or more of client device 806, networking system 802, and third-party system 808 may be physically or logically co-located with each other in whole or in part. Moreover, although FIG. 8 illustrates a particular number of client devices 806, networking systems 802, third-party systems 808, and networks 804, this disclosure contemplates any suitable number of client devices 806, networking systems 802, third-party systems 808, and networks 804. As an example and not by way of limitation, network environment 800 may include multiple client device 806, networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client device 806, networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example and not by way of limitation, a client device 806 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 806. A client device 806 may enable a network user at client device 806 to access network 804. A client device 806 may enable its user to communicate with other users at other client devices 806.

In particular embodiments, client device 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client device 806 one or more Hyper Text Markup Language (HTML) files responsive to the HTTP request. Client device 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 802 may be a network-addressable computing system that can host an online social network. Networking system 802 may generate, store, receive, and send social-networking data, such as, for example, user-profile data, concept-profile data, social-graph information, or other suitable data related to the online social network. Networking system 802 may be accessed by the other components of network environment 800 either directly or via network 804. In particular embodiments, networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, a networking system 802, or a third-party system 808 to manage, retrieve, modify, add, or delete, the information stored in data store.

In particular embodiments, networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 802 may provide users of the online social network the ability to communicate and interact with other users. In particular embodiments, users may join the online social network via networking system 802 and then add connections (e.g., relationships) to a number of other users of networking system 802 that they want to be connected to. Herein, the term "friend" may refer to any other user of networking system 802 with whom a user has formed a connection, association, or relationship via networking system 802.

In particular embodiments, networking system 802 may provide users with the ability to take actions on various types of items or objects, supported by networking system 802. As an example and not by way of limitation, the items and objects may include groups or social networks to which users of networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 802 or by an external system of third-party system 808, which is separate from networking system 802 and coupled to networking system 802 via a network 804.

In particular embodiments, networking system 802 may be capable of linking a variety of entities. As an example and not by way of limitation, networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating networking system 802. In particular embodiments, however, networking system 802 and third-party systems 808 may operate in conjunction with each other to provide social-networking services to users of networking system 802 or third-party systems 808. In this sense, networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client device 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 802 also includes user-generated content objects, which may enhance a user's interactions with networking system 802. User-generated content may include anything a user can add, upload, send, or "post" to networking system 802. As an example and not by way of limitation, a user communicates posts to networking system 802 from a client device 806. Posts may include data such as status updates or other textual data, location information, photos, videos, links, music or other similar data or media. Content may also be added to networking system 802 by a third-party through a "communication channel," such as a newsfeed or stream.

In particular embodiments, networking system 802 may include a variety of servers, sub-systems, programs, modules, logs, and data stores. In particular embodiments, networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 802 may also include suitable components such as network interfaces, security mechanisms, load balancers, failover servers, management-and-network-operations consoles, other suitable components, or any suitable combination thereof. In particular embodiments, networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 802 to one or more client devices 806 or one or more third-party system 808 via network 804. The web server may include a mail server or other messaging functionality for receiving and routing messages between networking system 802 and one or more client devices 806. An API-request server may allow a third-party system 808 to access information from networking system 802 by calling one or more APIs. An action logger may be used to receive communications from a web server about a user's actions on or off networking system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of networking system 802. A privacy setting of a user determines how particular information associated with a user can be shared. The authorization server may allow users to opt in to or opt out of having their actions logged by networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client devices 806 associated with users. Advertisement-pricing modules may combine social information, the current time, location information, or other suitable information to provide relevant advertisements, in the form of notifications, to a user.

Figure 9:
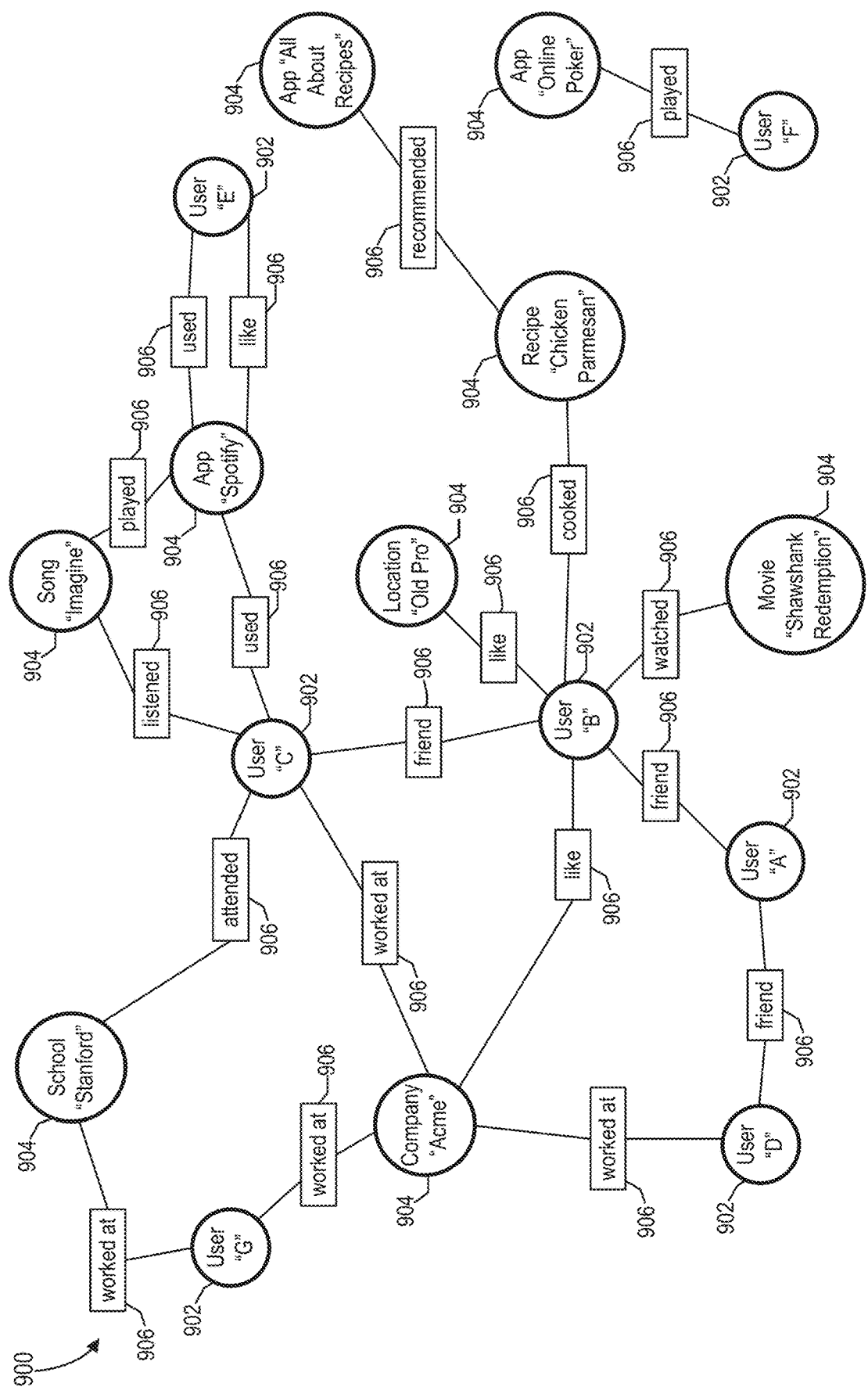
FIG. 9 illustrates a social graph in accordance with one or more embodiments.

FIG. 9 illustrates example social graph 900. In particular embodiments, networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a networking system 802, client device 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of networking system 802. As an example and not by way of limitation, a user may be an individual (human user), an entity (e.g., an enterprise, business, or third-party application), or a group (e.g., of individuals or entities) that interacts or communicates with or over networking system 802. In particular embodiments, when a user registers for an account with networking system 802, networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with networking system 802. In particular embodiments, a user node 902 may be associated with information provided by a user or information gathered by various systems, including networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with networking system 802 or a third-party website associated with a web-application server); an entity (such as, for example, a person, business, group, sports team, or celebrity); a resource (such as, for example, an audio file, video file, digital photo, text file, structured document, or application) which may be located within networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to networking system 802. Profile pages may also be hosted on third-party websites associated with a third-party system 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 806 to send to networking system 802 a message indicating the user's action. In response to the message, networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, networking system 802 may send a "friend request" to the second user. If the second user confirms the "friend request," networking system 802 may create an edge 906 connecting the first user's user node 902 to the second user's user node 902 in social graph 900 and store edge 906 as social-graph information in one or more data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, networking system 802 may create an edge 906 between a user node 902 and a concept node 904 in social graph 900. As an example and not by way of limitation, a user viewing a concept-profile page (such as, for example, by using a web browser or a special-purpose application hosted by the user's client device 806) may indicate that he or she likes the concept represented by the concept node 904 by clicking or selecting a "Like" icon, which may cause the user's client device 806 to send to networking system 802 a message indicating the user's liking of the concept associated with the concept-profile page. In response to the message, networking system 802 may create an edge 906 between user node 902 associated with the user and concept node 904, as illustrated by "like" edge 906 between the user and concept node 904. In particular embodiments, networking system 802 may store an edge 906 in one or more data stores. In particular embodiments, an edge 906 may be automatically formed by networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 802) or RSVP (e.g., through networking system 802) to an event associated with the advertisement. In addition or as an alternative, an advertisement may include social-networking-system context directed to the user. As an example and not by way of limitation, an advertisement may display information about a friend of the user within networking system 802 who has taken an action associated with the subject matter of the advertisement.

In particular embodiments, networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 802 may calculate a coefficient based on a user's actions. Networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Networking system 802 may analyze a user's actions to determine whether one or more of the actions indicate an affinity for subject matter, content, other users, and so forth. As an example and not by way of limitation, if a user may make frequently posts content related to "coffee" or variants thereof, networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 802 may calculate a coefficient based on the type of relationship between particular objects. Referencing the social graph 900, networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user node 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 802 may determine that the user has a higher coefficient with respect to the first photo than the second photo because having a tagged-in-type relationship with content may be assigned a higher weight and/or rating than having a like-type relationship with content. In particular embodiments, networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 806 of the user). A first user may be more interested in other users or concepts that are closer to the first user. As an example and not by way of limitation, if a user is one mile from an airport and two miles from a gas station, networking system 802 may determine that the user has a higher coefficient for the airport than the gas station based on the proximity of the airport to the user.

In particular embodiments, networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 802 may provide information that is relevant to user's interests and current circumstances, increasing the likelihood that they will find such information of interest. In particular embodiments, networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, networking system 802 may calculate the coefficient (or access the coefficient information if it has previously been calculated and stored). In particular embodiments, networking system 802 may measure an affinity with respect to a particular process. Different processes (both internal and external to the online social network) may request a coefficient for a particular object or set of objects. Networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 802 may send a request to the data store for the object. The request may identify the user associated with the request and may only be sent to the user (or a client device 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
 receiving, from a client-computing device, a search term in connection with providing a customized media effect for overlay on a digital media item;
 accessing a database of pre-generated media effects cross-referenced by descriptive metadata associated with each of the pre-generated media effects;
 if at least one pre-generated media effect that is associated with descriptive metadata that corresponds to the received search term exists in the accessed database:
  generating, by at least one processor, at least one dynamic media effect comprising one or more media assets by:
   identifying a media effect template comprising at least one field that is compatible with at least one of the one or more media assets, and
   positioning the one or more media assets within the media effect template based on an analysis of the digital media item; and
  providing, to the client-computing device, the at least one pre-generated media effect and the at least one dynamic media effect; and
 if at least one pre-generated media effect that is associated with descriptive metadata that corresponds to the received search term does not exist in the accessed database:
  generating a fallback media effect associated with one or more of: the received search term, one or more additional search terms, contextual information associated with the client-computing device, or characteristic information associated with the digital media item; and
providing, to the client-computing device, the fallback media effect.

2. The method as recited in claim 1, wherein receiving the search term comprises receiving a user-provided search term from the client-computing device.

3. The method as recited in claim 2, further comprising:
receiving the contextual information associated with the client-computing device;
receiving the characteristic information associated with the digital media item; and
determining the one or more additional search terms in connection with providing the customized media effect based on one or more of contextual information associated with the client-computing device or characteristic information associated with the digital media item.

4. The method as recited in claim 3, wherein:
the contextual information associated with the client-computing device comprises one or more of: location information associated with the client-computing device, client-computing device sensor information, or networking system information associated with a user of the client-computing device; and
the characteristic information associated with the digital media item comprises one or more of: facial analysis information associated with the digital media item, object analysis information associated with the digital media item, or visual analysis information associated with the digital media item.

5. The method as recited in claim 4, wherein:
wherein generating the at least one dynamic media effect is further based on the one or more additional search terms.

6. The method as recited in claim 5, further comprising identifying the at least one pre-generated media effect from the pre-generated media effects within the accessed database.

7. The method as recited in claim 6, further comprising generating a score for the at least one pre-generated media effect based on one or more of the contextual information associated with the client-computing device, or the characteristic information associated with the digital media item.

8. The method as recited in claim 3, wherein generating the at least one dynamic media effect further comprises:
identifying, within a cross-referenced index of media assets, one or more media assets associated with descriptive metadata that correlates with one or more of the received search term or the one or more additional search terms;
further generating a score for each of the one or more media assets based on characteristic information associated with the digital media item;
identifying, from the scored one or more media assets, a top-scoring media asset; and
generating the at least one dynamic media effect comprising the top-scoring media asset.

9. The method as recited in claim 8, wherein generating the at least one dynamic media effect comprising the top-scoring media asset comprises
associating the top-scoring media asset with the at least one field in the identified media effect template.

10. The method as recited in claim 1, wherein generating the fallback media effect is further in response to determining that no media assets respond to the received search term.

11. The method as recited in claim 1, further comprising ranking the at least one pre-generated media effect and the at least one dynamic media effect based on the contextual information associated with the client-computing device and the characteristic information associated with the digital media item.

12. The method as recited in claim 11, wherein providing the at least one pre-generated media effect and the at least one dynamic media effect comprises providing the at least one pre-generated media effect and the at least one dynamic media effect in ranked order.

13. A system comprising:
memory comprising a plurality of pre-generated media effects;
at least one processor; and
at least one non-transitory computer-readable storage medium storing instructions thereon that, when executed by the at least one processor, cause the system to:
receive, from a client-computing device, a search term in connection with providing a customized media effect for overlay on a digital media item;
access a database of pre-generated media effects cross-referenced by descriptive metadata associated with each of the pre-generated media effects;
if at least one pre-generated media effect from the plurality of pre-generated media effects that is associated with descriptive metadata that corresponds to the received search term exists in the accessed database:
generate at least one dynamic media effect comprising one or more media assets by:
identifying a media effect template comprising at least one field that is compatible with at least one of the one or more media assets, and
positioning the one or more media assets within the media effect template based on an analysis of the digital media item; and
provide, to the client-computing device, the at least one pre-generated media effect and the at least one dynamic media effect; and
if at least one pre-generated media effect from the plurality of pre-generated media effects that is associated with descriptive metadata that corresponds to the received search term does not exist in the accessed database:
generating a fallback media effect associated with one or more of: the received search term, one or more additional search terms, contextual information associated with the client-computing device, or characteristic information associated with the digital media item; and
providing, to the client-computing device, the fallback media effect.

14. The system as recited in claim 13, further storing instructions that, when executed by the at least one processor, cause the system to:
receive the contextual information associated with the client-computing device;
receive the characteristic information associated with the digital media item; and
determine the one or more additional search terms in connection with providing the customized media effect based on one or more of contextual information associated with the client-computing device, or characteristic information associated with the digital media item.

15. The system as recited in claim 14, wherein the instructions, when executed by the at least one processor, cause the system to
further generate the at least one dynamic media effect further based on the one or more additional search terms.

16. The system as recited in claim 15, wherein the instructions, when executed by the at least one processor, cause the system to identify the at least one pre-generated media effect from the pre-generated media effects with the accessed database.

17. The system as recited in claim 16, wherein the instructions, when executed by the at least one processor, cause the system to further generate the at least one dynamic media effect comprising one or more media assets by:
identifying, within a cross-referenced index of media assets, one or more media assets associated with descriptive metadata that correlates with one or more of the received search term or the one or more additional search terms;
further generating a score for each of the one or more media assets based on characteristic information associated with the digital media item;
identifying, from the scored one or more media assets, a top-scoring media asset; and
generating the at least one dynamic media effect comprising the top-scoring media asset.

18. A non-transitory computer-readable medium storing instructions thereon that, when executed by at least one processor, cause a client-computing device to:
receive a user-provided search term in connection with providing a customized media effect for overlay on a digital media item;
access a database of pre-generated media effects cross-referenced by descriptive metadata associated with each of the pre-generated media effects;
if at least one pre-generated media effect that is associated with descriptive metadata that correspond to the received search term exists in the accessed database:
generate at least one dynamic media effect comprising one or more media assets by:
identifying a media effect template comprising at least one field that is compatible with at least one of the one or more media assets, and
positioning the one or more media assets based on an analysis of the digital media item; and
provide the at least one pre-generated media effect and the at least one dynamic media effect for selection and application to the digital media item; and
if at least one pre-generated media effect that is associated with descriptive metadata that corresponds to the received search term does not exist in the accessed database:
generate a fallback media effect associated with one or more of: the received search term, one or more additional search terms, contextual information associated with the client-computing device, or characteristic information associated with the digital media item; and
provide the fallback media effect.

19. The non-transitory computer-readable medium as recited in claim 18, wherein the instructions, when executed by at least one processor, cause the client-computing device to:
generate a score for the at least one pre-generated media effect based on the contextual information associated with the client-computing device and the characteristic information associated with the digital media item;
generate a score for the at least one dynamic media effect based on the contextual information associated with the client-computing device and the characteristic information associated with the digital media item;
rank the at least one pre-generated media effect and the at least one dynamic media effect based on the generate scores; and
provide the at least one pre-generated media effect and the at least one dynamic media effect in ranked order.

20. The non-transitory computer-readable medium as recited in claim 18, wherein:
the contextual information associated with the client-computing device comprises one or more of: location information associated with the client-computing device, client-computing device sensor information, or networking system information associated with the user of the client-computing device; and
the characteristic information associated with the digital media item comprises one or more of: facial analysis information associated with the digital media item, object analysis information associated with the digital media item, or visual analysis information associated with the digital media item.

* * * * *